(12) United States Patent
Mueck et al.

(10) Patent No.: US 10,694,411 B2
(45) Date of Patent: Jun. 23, 2020

(54) TESTING OF USER EQUIPMENTS FOR IDLE PERIODS DISTRIBUTION

(71) Applicant: Intel IP Corporation, Santa Clara, CA (US)

(72) Inventors: Markus Dominik Mueck, Unterhaching (DE); Biljana Badic, Munich (DE)

(73) Assignee: Apple Inc., Cupertino, CA (US)

( * ) Notice: Subject to any disclaimer, the term of this patent is extended or adjusted under 35 U.S.C. 154(b) by 5 days.

(21) Appl. No.: 16/307,346

(22) PCT Filed: Apr. 10, 2017

(86) PCT No.: PCT/US2017/026860
§ 371 (c)(1),
(2) Date: Dec. 5, 2018

(87) PCT Pub. No.: WO2018/022151
PCT Pub. Date: Feb. 1, 2018

(65) Prior Publication Data
US 2019/0141553 A1    May 9, 2019

Related U.S. Application Data

(60) Provisional application No. 62/368,527, filed on Jul. 29, 2016.

(51) Int. Cl.
*H04W 24/08*    (2009.01)
*H04L 12/26*    (2006.01)
(Continued)

(52) U.S. Cl.
CPC ............ *H04W 24/08* (2013.01); *H04L 43/50* (2013.01); *H04W 74/085* (2013.01); *H04W 84/12* (2013.01)

(58) Field of Classification Search
CPC .... H04L 43/50; H04W 24/08; H04W 74/085; H04W 84/12
See application file for complete search history.

(56) References Cited

U.S. PATENT DOCUMENTS

2012/0093163 A1* 4/2012 Miskowicz ........... H04L 12/413
370/400
2015/0257019 A1* 9/2015 Durai ..................... H04L 1/24
370/252

(Continued)

OTHER PUBLICATIONS

International Patent Office—International Search Report and Written Opinion dated Jul. 12, 2017 from International Application No. PCT/US2017/026860, 15 pages.

(Continued)

*Primary Examiner* — Benjamin H Elliott, IV
(74) *Attorney, Agent, or Firm* — Fish & Richardson P.C.

(57) ABSTRACT

Embodiments include apparatuses, methods, and systems that may test a UE for its idle period distribution. A test system may identify a set of bins in which a union of the set of bins may be equal to a contention window, wherein each individual bin of the set of bins may have an associated probability. A first bin of the set of bins may have a first associated probability, and a second bin of the set of bins may have a second associated probability that is larger than the first associated probability. Each individual idle period may be assigned to a corresponding bin of the set of bins. A UE may have a pass status or a failure status based on the individual idle periods assigned to the corresponding bin of the set of bins, and the associated probability for the bin. Other embodiments may also be described and claimed.

25 Claims, 17 Drawing Sheets

(51) Int. Cl.
  *H04W 84/12* (2009.01)
  *H04W 74/08* (2009.01)

(56) References Cited

U.S. PATENT DOCUMENTS

2018/0302927 A1* 10/2018 Noh ................. H04L 27/26
2019/0141553 A1*  5/2019 Mueck ............... H04L 43/50

OTHER PUBLICATIONS

S. Szott et al., "Detecting backoff misbehaviour in IEE 802.11 EDCA," European Transactions on Telecommunications, Eur. Trans. Telecomms. 2011; 22:31-34, Published online Dec. 1, 2010 in Wiley Online Library (wileyonlinelibrary.com). DOI: 10.1002/ett.1459, vol. 22, No. 1, Jan. 30, 2011 (Jan. 30, 2011), 4 pages.
Bianchi et al., "Experimental assessment of the backoff behavior of commercial IEEE 802.11b network cards," INFOCOM 2007. 26th IEE International Conference on Computer Communications, IEEE, PI, May 1, 2007 (May 1, 2007), 9 pages.
Szott et al., "The Risks of WiFi Flexibility: Enabling and Detecting Cheating," Future Network & Mobile Summit 2013 Conference Proceedings, Paul Cunningham and Miriam Cunningham (Eds), IIMC International Information Management Corporation, 2013, ISBN: 978-1-905824-37-3, Jul. 3, 2013 (Jul. 3, 2013), 9 pages.
ETSI, "5 GHz high performance RLAN; Harmonized Standard covering the essential requirements of article 3.2 of Directive 2014/53/EU," Draft ETSI EN 301 893 V2.0.0 (Mar. 2015), Harmonized European Standard, 108 pages.

* cited by examiner

TESTING OF USER EQUIPMENTS FOR IDLE PERIODS DISTRIBUTION

CROSS REFERENCE TO RELATED APPLICATIONS

The present application is a national phase entry under 35 U.S.C. § 371 of International Application No. PCT/US2017/026860, filed Apr. 10, 2017, entitled "TESTING OF USER EQUIPMENTS FOR IDLE PERIODS DISTRIBUTION", which claims priority from U.S. Provisional Patent Application No. 62/368,527, filed Jul. 29, 2016, and entitled "EFFICIENT TESTING OF BACKOFF (IDLE TIME) IMPLEMENTATION," the entire disclosures of which are hereby incorporated by reference.

TECHNICAL FIELD

Embodiments generally may relate to the field of wireless communications.

BACKGROUND

Long Term Evolution (LTE) networks may provide wireless communication to various user equipments (UEs). Multiple other wireless systems may provide similar wireless communications as well.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
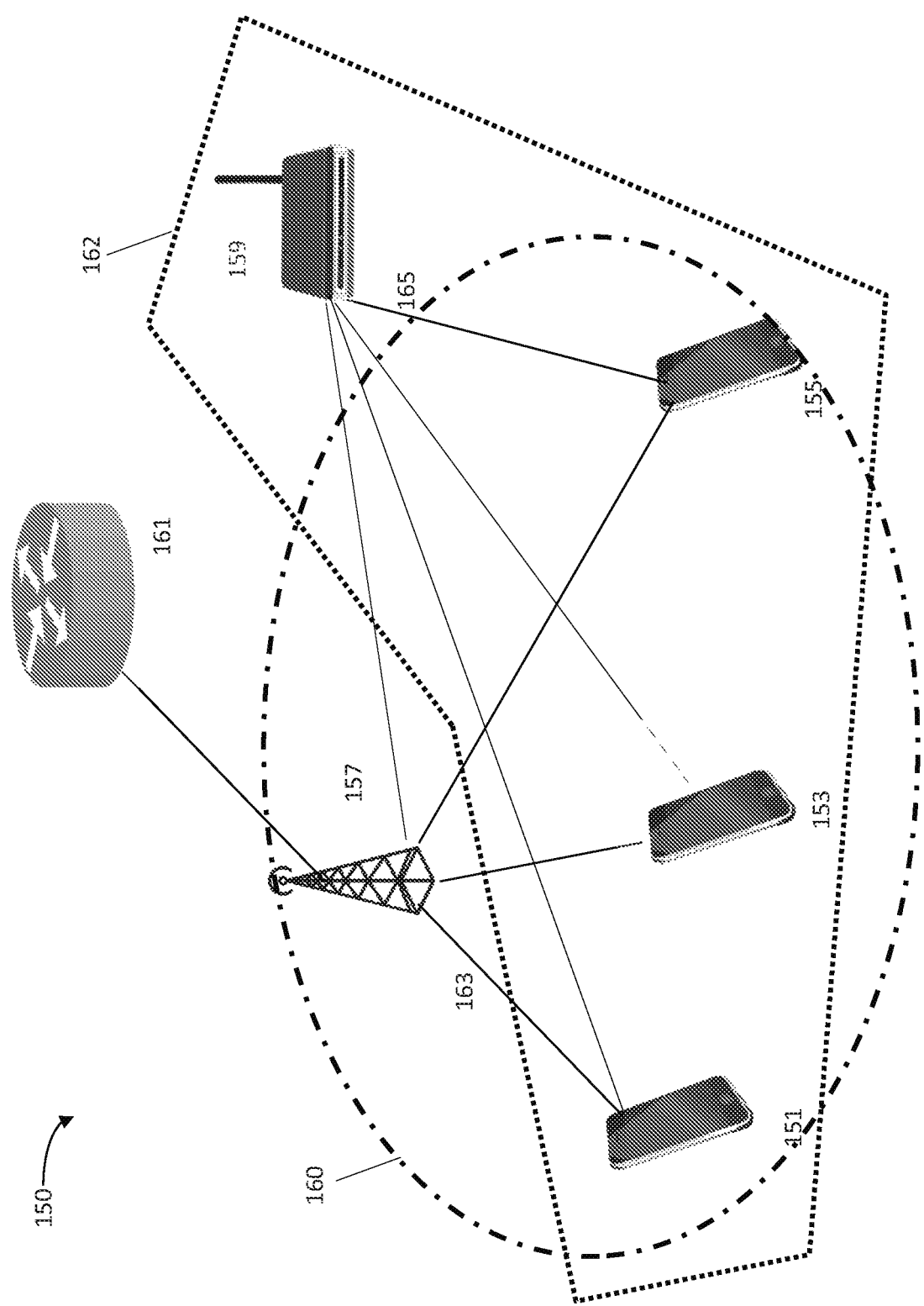
FIG. 1 illustrates a schematic high-level example of a network that includes multiple user equipments (UEs) operating within multiple wireless systems, in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

To cope with ever-increasing traffic demand, the 3rd Generation Partnership Project (3GPP) has been continuously increasing the network capacity by improving the spectral efficiency of the Long Term Evolution (LTE) system through various techniques. A Licensed assisted access (LAA) system may use unlicensed spectrum to supplement licensed spectrum in a LTE system, by aggregating together the licensed and unlicensed component carriers. Another LTE-based system, e.g., a MulteFire network or system, may deploy a self-contained and standalone network architecture without a licensed carrier. Other wireless systems, e.g., 802.11 (WiFi) systems, may operate at a same bandwidth, e.g., 5 GHz industrial, scientific, and medical (ISM) radio band, as an LAA system or a MulteFire system does. Various standardization bodies, e.g., the European Telecommunications Standards Institute (ETSI), have developed standards for Broadband Radio Access Networks (BRAN), e.g., European Harmonised Standard, which provide technical specifications for equipments, e.g., user equipments (UEs), to address issues caused by the coexistence of multiple wireless systems.

Multiple wireless systems, e.g., a WiFi system, a Multe-Fire system, an LAA system, etc., may use carrier sense multiple access with collision avoidance (CSMA/CA) based medium access control (MAC) protocol for medium access. In the following description, a medium for a wireless system may be referred to as an operating channel, channels, or a shared medium. In a wireless system based on a CSMA/CA MAC protocol, a UE may wait a random back-off, or otherwise referred to as an idle period, or an idle time, to gain the next access after each transmission over the medium by the UE. A UE may also wait a random idle period after each attempt to access the medium when the medium is busy. An idle period for a UE to access the medium may be within a contention window, which may be an interval of the form [0; CW]. An idle period for a UE to wait to access the medium may be determined randomly by the UE and may be of different duration at different moment of time. Overall, multiple idle periods for a UE to access the medium may form a statistical distribution.

In general, it may be more advantageous for a UE to wait short idle periods to increase the probability for accessing the medium. However, such short idle periods for one UE may be disadvantageous to other UEs, because the probabilities for other UEs to access the medium or channels may be reduced, since the medium may be shared with other UEs. On the other hand, a UE having long idle periods may be more disadvantageous to the UE since long idle periods may reduce the probability for the UE to access the medium. In order to improve the overall performance and efficiency of the wireless systems, it may be important for each UE operating in the wireless systems to have fairly distributed idle periods for the UE to access the medium.

A design document, e.g., a standard provided by ETSI, may provide a specification for the distribution of the idle periods within a contention window for a UE to access the medium. For example, a standard may specify a contention window [0; CW] as [0, CWmin/max], where the notation "CWmin/max" may refer to any value between "CWmin" and "CWmax," and "CWmin" and "CWmax" may be provided by the standard based on the applications or other considerations. In some embodiments, the value "CWmin" or "CWmax" may be infinite. UEs may be tested to conform to the distribution of the idle periods specified in the standards before they are allowed in the market. A UE may be tested to have a pass status or a failure status based on the distribution of idle periods for the UE to access the medium.

In embodiments, it may be desirable to efficiently test the distribution of idle periods for a UE to access a medium and determine based on the distribution of idle periods whether the UE has a pass or failure status according to a standard. One testing technique may only verify that the UE has idle periods within a contention window, [0; CWmin/max], without verifying the distribution of the idle periods of the UE in more refined subintervals of the contention window. A UE may have a pass status as long as all the idle periods of the UE are within the contention window. However, it is possible that some UE manufacturers may "cheat" and implement a more favorable random idle period generator on a UE to provide more short idle periods to increase the probability for the UE to access the medium, as long as the short idle periods are within the contention window. Such testing technique may be acceptable when a UE operates in only one wireless system, e.g., a WiFi system. However, multiple wireless systems, e.g., WiFi/MulteFire/LAA, operating concurrently on the same medium, may not have desired overall performance and efficiency when UEs operating within the systems only pass such a simple test. Hence, more accurate testing techniques may be desired for testing the distribution of idle periods for a UE to access a medium.

Embodiments herein may relate to approaches that test the distribution of idle periods within a contention window [0; CWmin/max] for a UE to access a medium shared among multiple UEs operating in multiple wireless systems. Embodiments herein may provide improved testing accuracy while reducing the cost for testing and thus reducing time-to-market. For example, embodiments may test the distribution of short idle periods more precisely, because short idle periods may be more desirable to the UE to provide preferred medium access. On the other hand, embodiments herein may test the distribution of longer idle periods less precisely, because long idle periods may be less desirable to the UE and have less undesirable impact to the medium access behavior of other UEs sharing the same medium.

Embodiments herein may perform tests on a UE to gather records of a predetermined total number of idle periods, e.g., 10,000 idle periods, to calculate the distribution of idle periods for the UE to access a medium. In embodiments, to gather records of a predetermined total number of idle periods for a UE may prevent the UE from being tested indefinitely if the UE has some error in generating a correct distribution of idle periods. A reasonable total number of idle periods may also increase the confidence of the test so that the UE is adequately tested with big enough samples. A testing operation flow may be terminated when the total number of idle periods is collected.

After a set of total number of idle periods for a UE to access a medium has been collected, analysis may be performed on the set of idle periods of the UE to determine whether the UE has a pass status or a failure status in satisfying a distribution specified in a standard or a design document. In performing the analysis, a contention window may be split into multiple observation intervals, e.g., a set of bins, and each bin may have an associated probability for allowed number of idle periods within the bin. Furthermore, the idle periods of the UE observed, or collected during the testing of the UE may be classified into corresponding bins based on the duration of the idle periods. The number of idle periods within each bin may be counted and compared based on the associated probability for each bin, to determine the UE has a pass status or a failure status.

In some embodiments, the bins of the contention window may be equally spaced with equal duration. In some other embodiments, efficiency may be gained by using bins of unequal duration. For example, since the purpose of testing a UE is to ensure the UE does not have too many short idle periods to increase the probability to access the medium, it may be desirable to have bins containing short idle periods to be more thoroughly tested with shorter duration for the bins. On the other hand, since a UE having long idle periods would not impact other UEs undesirably, the bins containing high idle periods may have a longer duration so that the overall test can be more efficient. Embodiments may simply verify whether a ratio of long idle periods compared to short idle periods to be correct with respect to a given standard.

Accordingly, besides using bins of unequal duration, the associated probabilities with the bins may be different as well. Embodiments herein may include two different kinds of bins, where a first bin may include a first associated probability, and a second bin may include a second associated probability that is larger than the first associated probability. For example, comparing to bins containing longer idle periods, bins containing shorter idle periods may have larger associated probability so that more idle periods may be allowed within the bin during the test. Such a testing technique may be more efficient since the test of the UE may stop sooner without collecting more data on longer idle periods for the UE.

In embodiments, a UE may have a pass status when a probability calculated for each individual bin of the set of bins based on a number of idle periods assigned to each individual bin is smaller than or equal to the associated probability for each individual bin of the set of bins. In embodiments, a UE may have a failure status when a probability calculated for a bin of the set of bins based on a number of idle periods assigned to the bin is larger than an associated probability for the bin. In embodiments, a UE may have a failure status when an occupied period for the medium has a duration larger than a predetermined occupancy duration. Other comparison criteria may be used as well, to compare the associated probability for each individual bin and the individual number of idle periods assigned to each individual bin.

FIG. 1 illustrates a schematic high-level example of a network 150 that includes multiple UEs, such as a UE 151, a UE 153, and a UE 155, operating within multiple wireless systems, e.g., a wireless system 160 and a wireless system 162, in accordance with various embodiments.

In embodiments, the wireless system 160 may include the UE 151, the UE 153, the UE 155, and an evolved NodeB (eNB) 157 operating over a medium 163. The wireless system 160 may be a MulteFire system or an LAA system operating in unlicensed spectrum and/or licensed spectrum. In addition, the wireless system 162 may include the UE 151, the UE 153, the UE 155, and an access point (AP) 159 operating over a medium 165. The wireless system 162 may be a WiFi system. The network 150 may further include a network entity 161, which perform management functions for the wireless system 160 and the wireless system 162. More devices, such as more UEs, eNBs, APs may be included in the network 150, which are not shown. The two wireless systems, e.g., the wireless system 160 and the wireless system 162, are for example only and are not limiting. In embodiment, the network 150 may include only one wireless system with multiple UEs accessing a medium shared among them.

In embodiments, the wireless system 160 and the wireless system 162 may be integrated together and managed by the network entity 161. Some traffic from a UE, e.g., the UE 151, the UE 153, the UE 155, may be routed directly between the eNB 157 and the UE. Some other traffic may be routed from the UE, e.g., the UE 151, the UE 153, the UE 155, to the AP 159, and further routed to the eNB 157.

A UE, e.g., the UE 151, the UE 153, the UE 155, may be an initiating device that initiates a sequence of one or more transmissions over a medium, e.g., the medium 163 or the medium 165, by a channel access mechanism. Additionally and alternatively, the UE, e.g., the UE 151, the UE 153, the UE 155, may be a responding device. In embodiments, a UE may be both an initiating device and a responding device at different times. A UE, e.g., the UE 151, the UE 153, the UE 155, may be a supervising device that controls operating parameters of one or more other UEs. Additionally and alternatively, the UE, e.g., the UE 151, the UE 153, the UE 155, may be a supervised device. A UE may be a companion device communicating with another UE.

In embodiments, the medium 163 or the medium 165 may be shared among multiple UEs, e.g., the UE 151, the UE 153, the UE 155. A UE, e.g., the UE 151, the UE 153, the UE 155, may use CSMA/CA based MAC protocol to access the medium shared among them. The medium 163 for the wireless system 160 and the medium 165 for the wireless system 162 may be the same, or have a common part shared between the two wireless systems. The medium 163 and the medium 165 may include one or more channels.

In embodiments, a medium, e.g., the medium 163 or the medium 165, may be occupied when a transmission may be performed by a UE, e.g., the UE 151, the UE 153, the UE 155, or by a companion device communicating with the UE. Otherwise, the medium may be not occupied and may be accessed by a UE. A medium, e.g., the medium 163 or the medium 165, may be occupied for an occupied time interval, or not occupied for a non-occupied time interval. A non-occupied time interval may be a time interval when there is no transmission on the medium performed by the UE or by a companion device. An occupied time interval may include a start time and a duration of a time interval when the medium is occupied by a transmission performed by the UE or by a companion device communicating with the UE.

In embodiments, an occupied period may be an occupied time interval. In some other embodiments, an occupied period may include more than one occupied time interval. For example, an occupied period may include one or more occupied time intervals for one or more transmissions performed by the UE and zero or more occupied time intervals for zero or more transmissions performed by a companion device communicating with the UE.

In embodiments, an idle period may be a non-occupied time interval when the medium is not occupied by any transmission. In some other embodiments, an idle period may be a non-occupied time interval that has a duration larger than a predefined idle duration time. When a non-occupied time interval has a duration smaller than a predefined idle duration time, the medium may not be deemed as idle, and the non-occupied time interval may not be deemed as an idle period. For example, an idle period may be a non-occupied time interval with a duration larger than a predefined idle duration time, or a non-occupied time interval between two occupied periods for the medium.

In embodiments, a medium, e.g., the medium 163 or the medium 165, may be a band in any frequency range (in particular 0 Hz-300 GHz), such as for example unlicensed bands (as the 5 GHz ISM band) or the licensed-by-rule approach which is applied by the FCC (Federal Communications Commission) to the 3.5 GHz Spectrum Access System (SAS) General Authorized Access (GAA) tier, etc. Some targets for future application may include the 28, 37 and 60 GHz bands. In particular, technical which has been designed for unlicensed bands may be used straightforwardly (only adapting the channel access parameters as described in this document) but also various other systems can be used following a suitable adaptation (see for example the modification of 3GPP LTE to introduce LAA in the 5 GHz ISM band).

In embodiments, the network 150, the wireless system 160, or the wireless system 162 may include in particular the following: LTE and Long Term Evolution-Advanced (LTE-A) and LTE-Advanced Pro, 5th Generation (5G) communication systems, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE, 3GPP LTE Advanced (Long Term Evolution Advanced)), 3GPP LTE-Advanced Pro, CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System—Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 14), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), ETSI OneM2M, IoT (Internet of things), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, etc.), etc. It is understood that such exemplary scenarios are demonstrative in nature, and accordingly may be similarly applied to other mobile communication technologies and standards.

Figure 2:
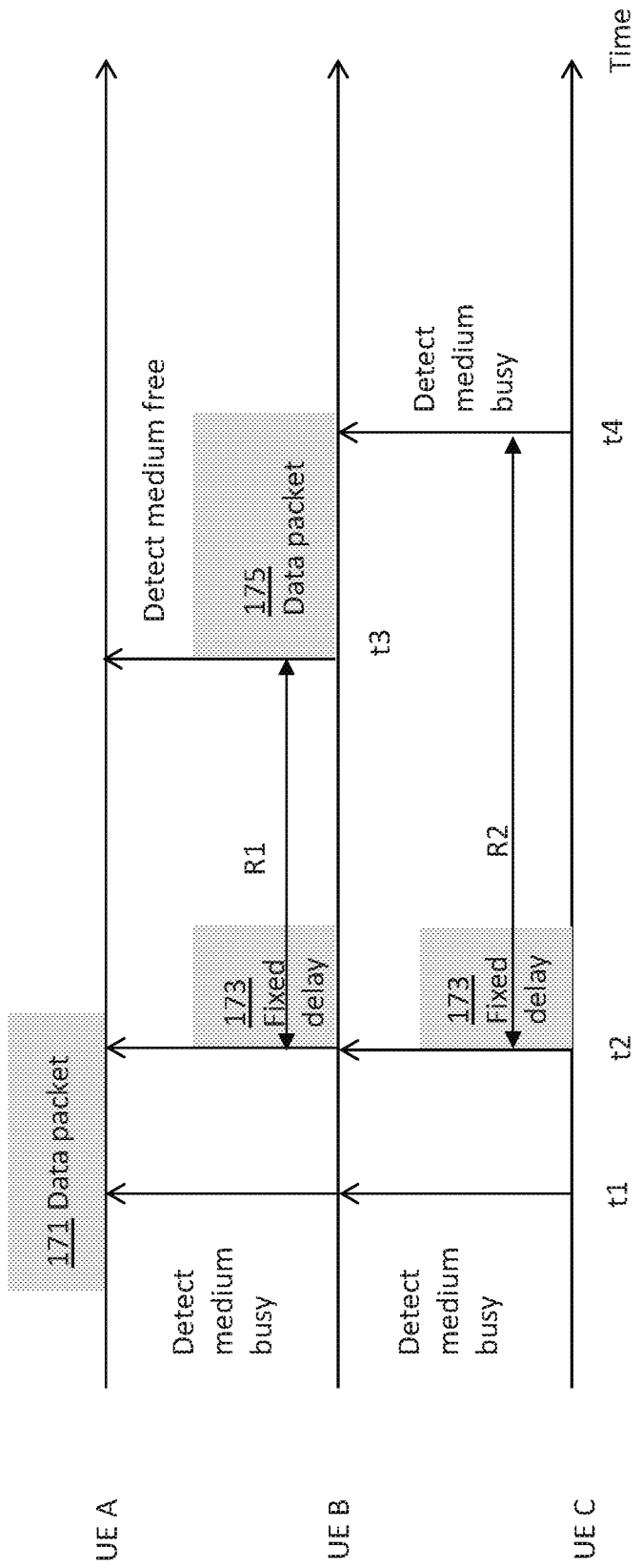
FIG. 2 illustrates an example of various idle periods for multiple UEs to access a medium, in accordance with various embodiments.

FIG. 2 illustrates an example of various idle periods for multiple UEs, e.g., a UE A, a UE B, and a UE C, to access a medium, in accordance with various embodiments. In embodiments, the UE A, the UE B, and the UE C may be the UE 151, the UE 153, and the UE 155 that may access a medium, e.g., the medium 163 or the medium 165, as shown in FIG. 1.

In embodiments, the UE A, the UE B, the UE C may use CSMA/CA based MAC protocol to access the medium shared among them. In embodiments, at time t1, the medium may be occupied by UE A in a transmission, e.g., sending a data packet 71. In the meantime, the UE B and the UE C may listen to the medium to determine whether some other UE, e.g., the UE A, is transmitting.

At time t2, the UE B and the UE C may attempt to access the medium by carrier sensing. The UE B or the UE C may perform carrier sensing in different ways, e.g., physical carrier sensing by detecting activity on the radio interface, or virtual carrier sensing. At time t2, the UE B and the UE C may fail to access the medium, because the medium may still be occupied by the data packet 171.

The UE B and the UE C may wait an idle period to gain the next access. The UE B may wait an idle period R1, and the UE C may wait an idle period R2. The idle period R1 and the idle period R2 may be within a contention window [0; CW]. In embodiments, the idle period R1 and the idle period R2 may be the same, or may be different. The idle period R1 and the idle period R2 may be determined randomly by the UE B and the UE C respectively. A timer may be used to keep track of the idle period R1 for the UE B or the idle period R2 for the UE C. The timer may be decreased as long as the UE is waiting. When the timer may be decreased to 0, the UE B or the UE C may attempt to access the medium again.

The idle period R1 and the idle period R2 may be larger than a predetermined time interval. For example, when the medium may be used in a WiFi system, the idle period R1 and the idle period R2 may be larger than a distributed coordination function (DC) inter-frame space (DIFS) time interval, which may be a fixed delay 173.

In embodiments, the idle period R1 may be smaller than the idle period R2, and the UE B may gain access to the medium at time t3 at the end of the idle period R1. At time t3, the UE B may access the medium and transmit a data packet 175, while the UE C may still be in the idle period R2. At time t4, the idle period R2 may end for the UE C, and the UE C may attempt to access the medium, and fails to do so because the data package 175 may still be in transmission. Hence, the UE B may have higher probability in accessing the medium when its idle period R1 is smaller.

Figure 3:
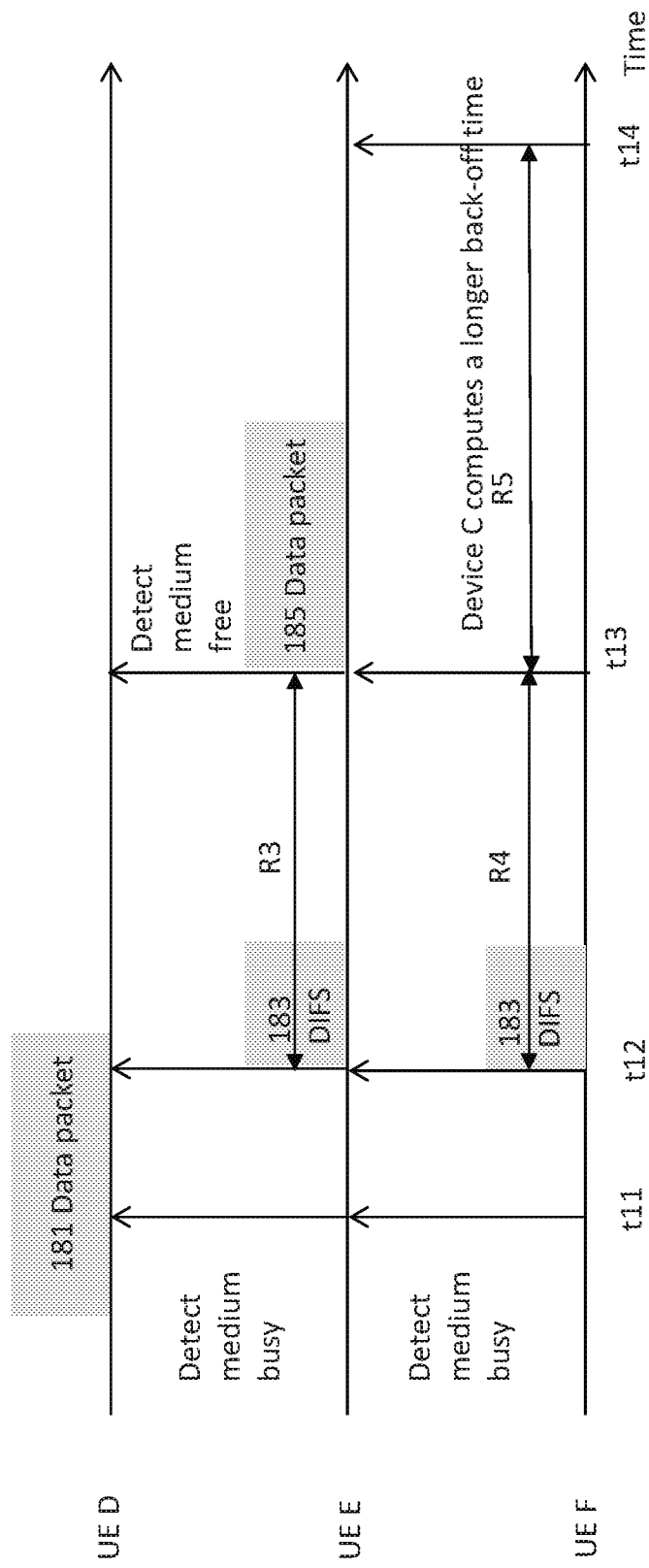
FIG. 3 illustrates another example of various idle periods for multiple UEs to access a medium, in accordance with various embodiments.

FIG. 3 illustrates another example of various idle periods for multiple UEs, e.g., a UE D, a UE E, and a UE F, to access a medium, in accordance with various embodiments. In embodiments, the UE D, the UE E, and the UE F may be the UE 151, the UE 153, and the UE 155 that may access a medium, e.g., the medium 163 or the medium 165, as shown in FIG. 1. In addition, the UE D, the UE E, and the UE F may be examples of the UE A, the UE B, and the UE C, as shown in FIG. 2.

In embodiments, the UE D, the UE E, the UE F may use CSMA/CA based MAC protocol to access the medium shared among them. In embodiments, at time t11, the medium may be occupied by the UE D in a transmission, e.g., sending a data packet 181. At the meantime, the UE E and the UE F may listen to the medium to determine whether some other UE, e.g., the UE D, is transmitting.

At time t12, the UE E and the UE F may attempt to access the medium by carrier sensing, and may fail to access the medium, because the medium may still be occupied by the data packet 181. The UE E and the UE F may wait an idle period to gain the next access. The UE E may wait an idle period R3, and the UE F may wait an idle period R4. The idle period R3 and the idle period R4 may be within a contention window [0; CW]. In embodiments, the idle period R3 nd the idle period R4 may be the same, and may be larger than a DIFS time interval, which may be a fixed delay 183.

In embodiments, when the idle period R3 may be the same as the idle period R4, an access collision may occur between the UE E and the UE F at time t13, which is the end of the period R3. Either UE E or the UE F may gain access to the medium. For example, the UE E may access the medium and transmit a data packet 185, while UE F may compute a longer idle period R5 before the next attempt to access the medium. At time t14, the idle period R5 may end for the UE F, and the UE F may attempt to access the medium.

Figure 4:
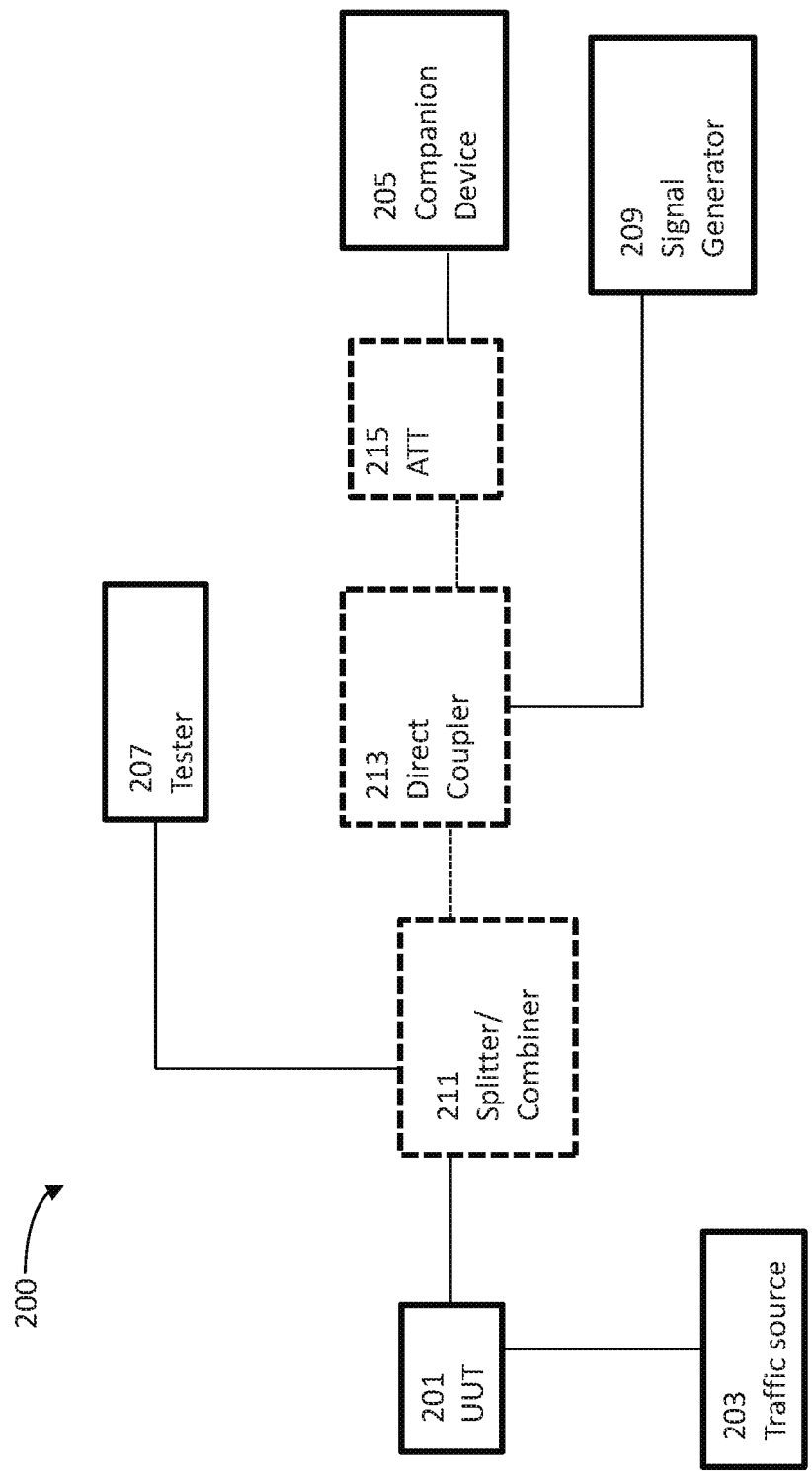
FIG. 4 illustrates an example test system for testing a UE in a wireless system for idle period distribution, in accordance with various embodiments.

FIG. 4 illustrates an example test system, e.g., a test system 200, for testing a UE, e.g., a unit under test (UUT) 201, in a wireless system for idle period distribution, in accordance with various embodiments. In embodiments, the UUT 201 may be the UE 151, the UE 153, and the UE 155 as shown in FIG. 1. In embodiments, the test system 200 may include a UUT 201, a traffic source 203, a companion device 205, a tester 207, and a signal generator 209. In addition, the test system 200 may include various components to manage the traffic, e.g., a splitter/combiner 211, a direct coupler 213, and an antenna 215. Components in the test system 200 are for examples only and are not limiting. There may be more or fewer components as those shown in FIG. 4. For example, the signal generator 209 may not present in some test system 200, or may not generate any signals. Similarly, the splitter/combiner 211, the direct coupler 213, or the antenna 215 may be optional too.

In embodiments, the test system 200 may operate at normal test conditions. The medium under test may include multiple channels, while the channels and the channel bandwidths to be used for testing may be adjusted according to the standard being tested. The UUT 201 may be configured to operate at its maximum output power level. In some other embodiments, the UUT 201 may be configured to operate at lower than its maximum output power level.

During the test, the UUT 201 may connect to the companion device 205 to communicate. The received signal level from the companion device 205 at the UUT 201 may be sufficient to maintain a reliable link for the duration of the test. For example, the received signal level at the UUT 201 from the companion device 205 may be around −50 dBm/MHz.

The traffic source 203 may generate packets for the UTT 201. In embodiments, the traffic source 203 may generate enough packets that exceeds the UTT 201 buffer capacity so that the UTT 201 may be in full buffer condition. In embodiments, the traffic source 203 may be configured by "iperf-c server.local-F/dev/null-l 1400B-u -4 -tos 0-b 999M -t 777," which generates a stream of zeros (taken from pseudo device "/dev/null") encapsulated in UDP packets of 1400 B payload length, using IPv4, marked as best effort (differentiated services code point 000000) at a rate of 999 Mb/s for duration of 777s.

The tester 207, which may be a spectrum analyzer, may be coupled to the UUT 201 and the companion device 205. The tester 207 may be used to monitor the transmissions of the UUT 201 in response to the interference signal, which may be generated by the signal generator 209. The tester 207 may collect records of the test for idle periods of the UUT 201, and may further determine that the UUT 201 has a pass status or a failure status based on the distribution of the idle periods within a contention window.

The tester 207 may operate in various configurations depending on the applications and the UUT 201 being tested. For example, the tester 207 may be configured as follow, for Resolution Bandwidth (RBW), Video Bandwidth (VBW), and other parameters:

RBW: ≥ Occupied Channel Bandwidth (if the tester 207 does not support this setting, the highest available setting may be used);

VBW: 3×RBW (if the tester does not support this setting, the highest available setting may be used);

Detector Mode: Root Mean Square (RMS);

Centre Frequency: Equal to the centre frequency of the operating channel;

Span: 0 Hz;

Sweep time: >Channel Occupancy Time;

Trace Mode: Clear/Write;

Trigger Mode: Video or External.

The tester 207 may record and collect occupied time intervals, or non-occupied time intervals for the medium being tested. The tester 207 may record a start time and a duration of every transmission (energy) on the medium, or operating channel, performed by the UUT 201, or by the companion device 205 communicating with the UUT 201. In embodiments, a maximum measurement uncertainty of each record may be no more than ±100 ns, or other reasonable error range. The tester 207 may record a start time and a duration for a non-occupied time interval. Based on the collected records of occupied time intervals, and non-occupied time intervals, the tester 207 may perform analysis on the records to identify the occupied periods and idle periods, and the distribution of the idle periods.

Figure 5:
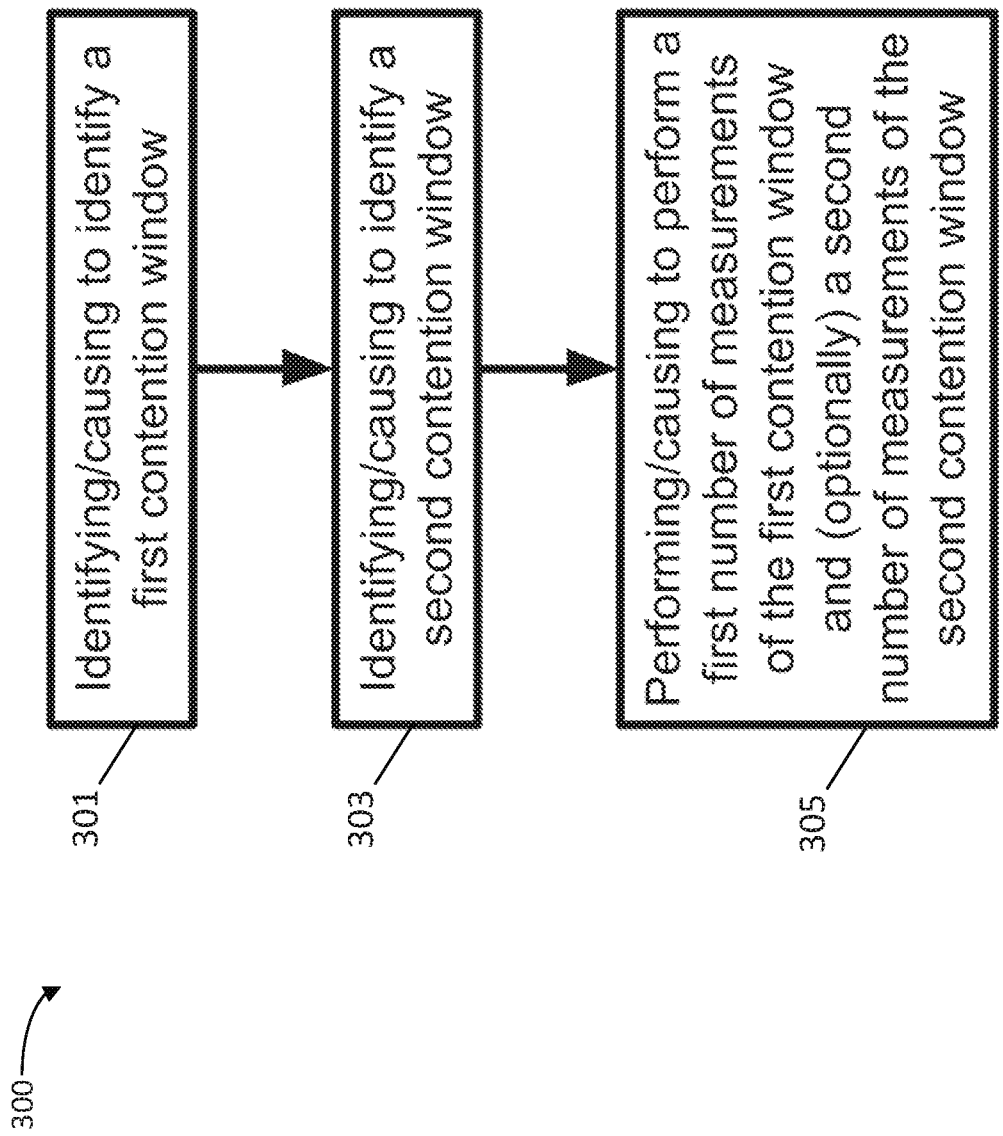
FIG. 5 illustrates an example operation flow/algorithmic structure for testing a UE in a wireless system for idle period distribution, in accordance with various embodiments.

FIG. 5 illustrates an example operation flow/algorithmic structure, e.g., an operation flow 300, for testing a UE in a wireless system for idle period distribution, in accordance with various embodiments. In embodiments, the operation flow 300 may be performed by the test system 200 to test the device UUT 201, as shown in FIG. 4. In embodiments, the operation flow 300 may be performed to test a UE, e.g., the UE 151, the UE 153, and the UE 155 as shown in FIG. 1.

For example, the operation flow 300 may include, at 301, identifying or causing to identify a first contention window related to a first back-off (idle) time of a CSMA/CA frame. The operation flow 300 may further include, at 303, identifying or causing to identify a second contention window related to a second and a third back-off (idle) time of the CSMA/CA frame, wherein the second contention window may be larger than the first contention window. In addition, the operation flow 300 may include, at 305, performing or causing to perform a first number of measurements of the first contention window and a second number of measurements of the second contention window.

Figure 6:
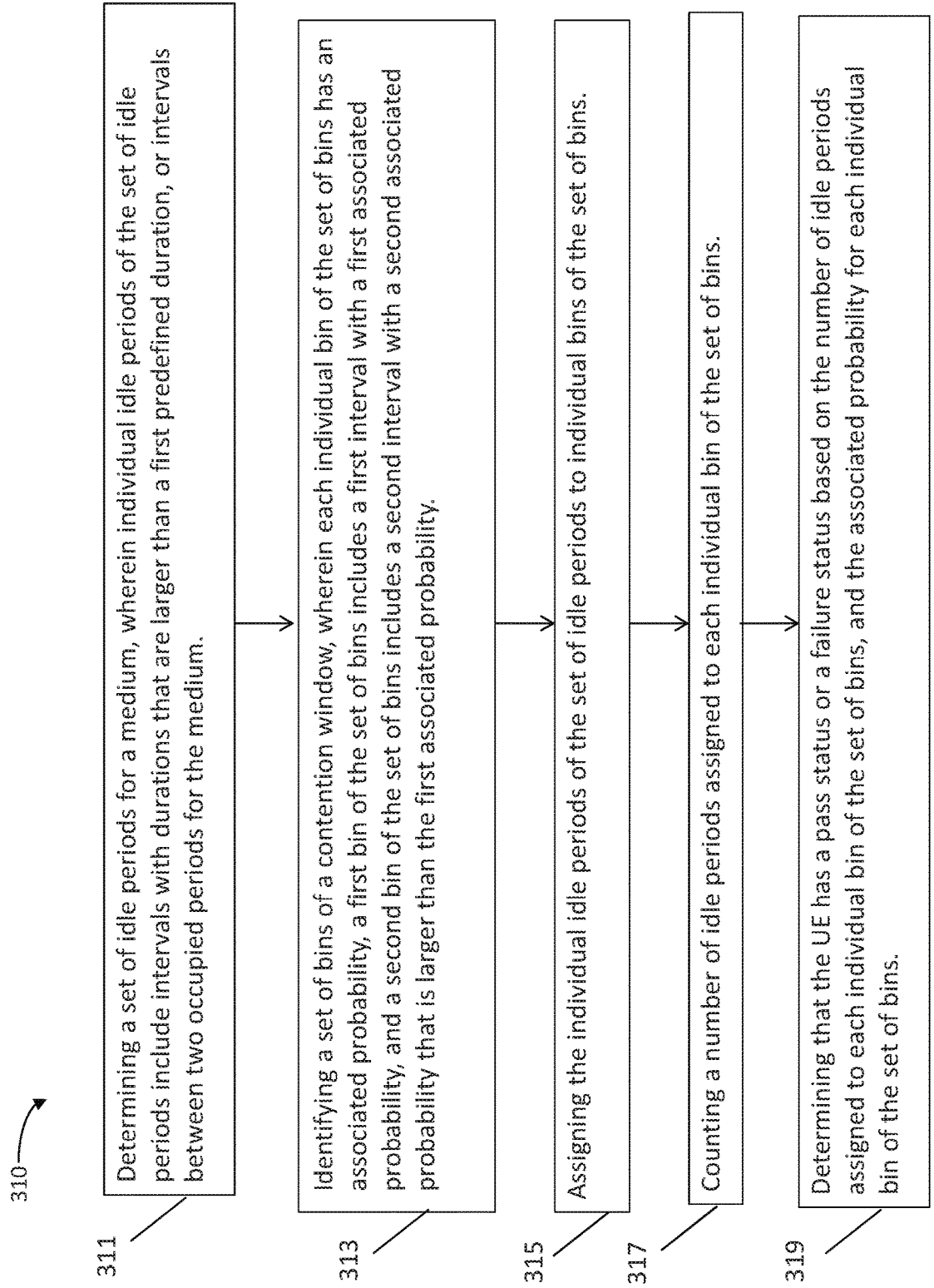
FIG. 6 illustrates another example operation flow/algorithmic structure for testing a UE in a wireless system for idle period distribution, in accordance with various embodiments.

FIG. 6 illustrates another example operation flow/algorithmic structure, e.g., an operation flow 310, for testing a UE in a wireless system for idle period distribution, in accordance with various embodiments. In embodiments, the operation flow 310 may be performed by the test system 200 to test the device UUT 201, as shown in FIG. 4. In embodiments, the operation flow 310 may be performed to test a UE, e.g., the UE 151, the UE 153, and the UE 155 as shown in FIG. 1. The operation flow 310 may test the distribution of idle periods within a contention window, with respect to a specified probability distribution to determine the UE under test has a pass or failure status.

For example, the operation flow 310 may include, at 311, determining a set of idle periods for a medium. In some embodiments, an idle period may be any non-occupied time interval of the medium. In some other embodiments, an idle period may be a non-occupied time interval with a duration that is larger than a predefined idle duration time, or a non-occupied time interval between two occupied periods for the medium.

The operation flow 310 may further include, at 313, identifying a set of bins of a contention window. In embodiments, each bin may be disjoint from another bin. Furthermore, each bin of the set of bins may have an associated probability. In some embodiments, a first bin may have a first associated probability, and a second bin may have a second associated probability larger than the first associated probability.

The operation flow 310 may further include, at 315, assigning the individual idle periods of the set of idle periods to individual bins of the set of bins.

The operation flow 310 may further include, at 317, counting a number of idle periods assigned to each individual bin of the set of bins.

The operation flow 310 may further include, at 319, determining that the UE has a pass status or a failure status based on the number of idle periods assigned to each individual bin of the set of bins, and the associated probability for each individual bin of the set of bins.

The operation flow 300 in FIG. 5 and the operation flow 310 in FIG. 6 are for examples only, and are not limiting. There may be other ways to test a UE in a wireless system for idle period distribution. The idle periods may be defined differently based on the applications. More details to show the operation flow 300 and the operation flow 310 are presented in FIGS. 7-14.

Figure 7:
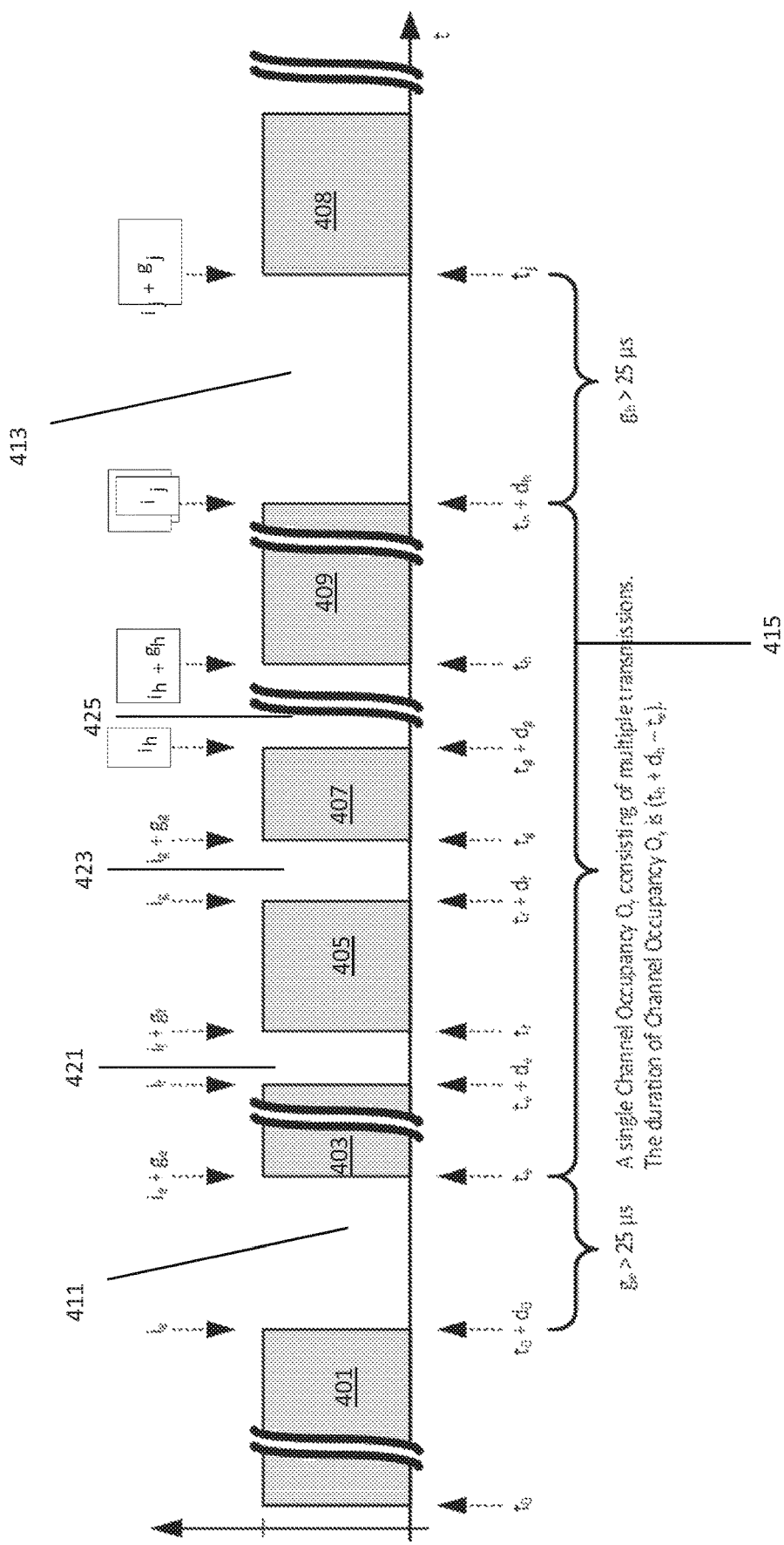
FIG. 7 illustrates example idle periods and occupied periods for a medium, in accordance with various embodiments.

FIG. 7 illustrates example idle periods, e.g., an idle period 411, an idle period 413, and occupied periods, e.g., an occupied period 415, for a medium, in accordance with various embodiments. In embodiments, the idle periods, e.g., the idle period 411, the idle period 413, and occupied periods, e.g., the occupied period 415, may be obtained based on an operation flow, e.g., the operation flow 300 in FIG. 5 or the operation flow 310 in FIG. 6, performed by the test system 200 to test the device UUT 201, as shown in FIG. 2. In embodiments, the idle periods, e.g., the idle period 411, the idle period 413, and occupied periods, e.g., the occupied period 415, may be idle periods and occupied periods for a UE, e.g., the UE 151, the UE 153, and the UE 155 as shown in FIG. 1.

A test system, e.g., the test system 200, may test a UE and collect a plurality of occupied time intervals and non-occupied time intervals, following a testing operation flow, e.g., the operation flow 300 or the operation flow 310. For example, there may be occupied time intervals 401, 403, 405, 407, 409, and 408, and non-occupied time intervals 411, 413, 421, 423, and 425. Each occupied time interval, e.g., the occupied time intervals 401, 403, 405, 407, 409, and 408, may include a time interval during which the medium is occupied by a transmission performed by the UE or by a companion device communicating with the UE. Similarly, each non-occupied time interval, e.g., the non -occupied time intervals 411, 413, 421, 423, or 425 may include a time interval during which the medium is not occupied.

In embodiments, an occupied time interval, e.g., the occupied time interval 401, 403, 405, 407, 409, or 408, may be indicated by a start time and a duration of the occupied time interval. For example, $t_x$ may denote a point in time when the medium becomes occupied and $d_x$ may denote a duration the medium is subsequently occupied, with an occupied time interval $[t_x, t_x+d_x]$. Hence, the occupied time interval 401 may be denoted by $[t_0, t_0+d_0]$. Similarly, the occupied time interval 403, 405, 407, and 409, may be denoted by $[t_e, t_e+d_e]$, $[t_f, t_f+d_f]$, $[t_g, t_g+t_g]$, and $[t_h, t_h+d_h]$, respectively. In embodiments, closed intervals, e.g., $[t_x, t_x+d_x]$ may be used as examples only. In some embodiments, a closed interval, e.g., $[t_x, t_x+d_x]$, may be substituted by an open interval, e.g., $(t_x, t_x+d_x)$, or a half-open interval, e.g., $[t_x, t_x+d_x)$, or $(t_x, t_x+d_x]$. In some other embodiments, an open interval may be denoted as $]t_x, t_x 30 d_x)$ or $]t_x, t_x+d_x[$.

In embodiments, a non-occupied time interval, e.g., the non-occupied time interval 411, 413, 421, 423, and 425, may be indicated by a start time and a duration of the non-occupied time interval. For example, $i_y$ may denote a point in time the medium becomes unoccupied and $g_y$ may denote the duration the medium is subsequently unoccupied, with a non-occupied time interval $[i_y, i_y+g_y]$. Hence, the non-occupied time interval 411, 413, 421, 423, and 425, may be denoted by $[i_e, i_e+g_e]$, $[i_j, i_j+g_j]$, $[i_f, i_f+g_f]$, $[i_g, i_g+g_g]$, $[i_h, i_h+g_h]$, respectively.

An occupied period, e.g., the occupied period 415, may include one or more occupied time intervals. In some embodiments, an occupied period may be one occupied time interval. In some other embodiments, an occupied period may include a plurality of occupied time intervals separated by non-occupied time intervals. For example, the occupied period 415 may include the occupied time intervals 403, 405, 407, and 409. Any two neighbouring occupied time intervals of an occupied period may be separated by a non-occupied time interval of a duration less than or equal to a predefined idle duration time. For example, the occupied time intervals 403 and 405 of the occupied period 415 may be separated by a non-occupied time interval 421, which has a duration $g_f$ that is less than or equal to a predefined idle duration time, e.g., 25 μs. Therefore non-occupied time intervals within an occupied period may have a duration $g_y$ that is less than or equal to the predefined idle duration time, e.g., 25 μs. Hence, an occupied period, e.g., the occupied period 415 may include one or more time intervals for one or more transmissions performed by the UE. In addition, the occupied period 415 may include zero or more time intervals for zero or more transmissions performed by a companion device communicating with the UE. In embodiments, the occupied period 415 may be within the interval $[t_e, t_h+d_h]$ and may have an occupied duration $O_x$ as $(t_h+d_h-t_e)$ with $t_e<t_h$.

Accordingly, an idle period may be a non-occupied time interval with a duration larger than a predefined idle duration time, e.g., 25 μs, or 27 μs. Additionally and alternatively, an idle period may be a non-occupied time interval between two occupied periods. By examining the set of occupied time intervals and non-occupied time intervals collected during a test of a UE, a set of occupied periods and a set of idle periods may be determined.

Figure 8:
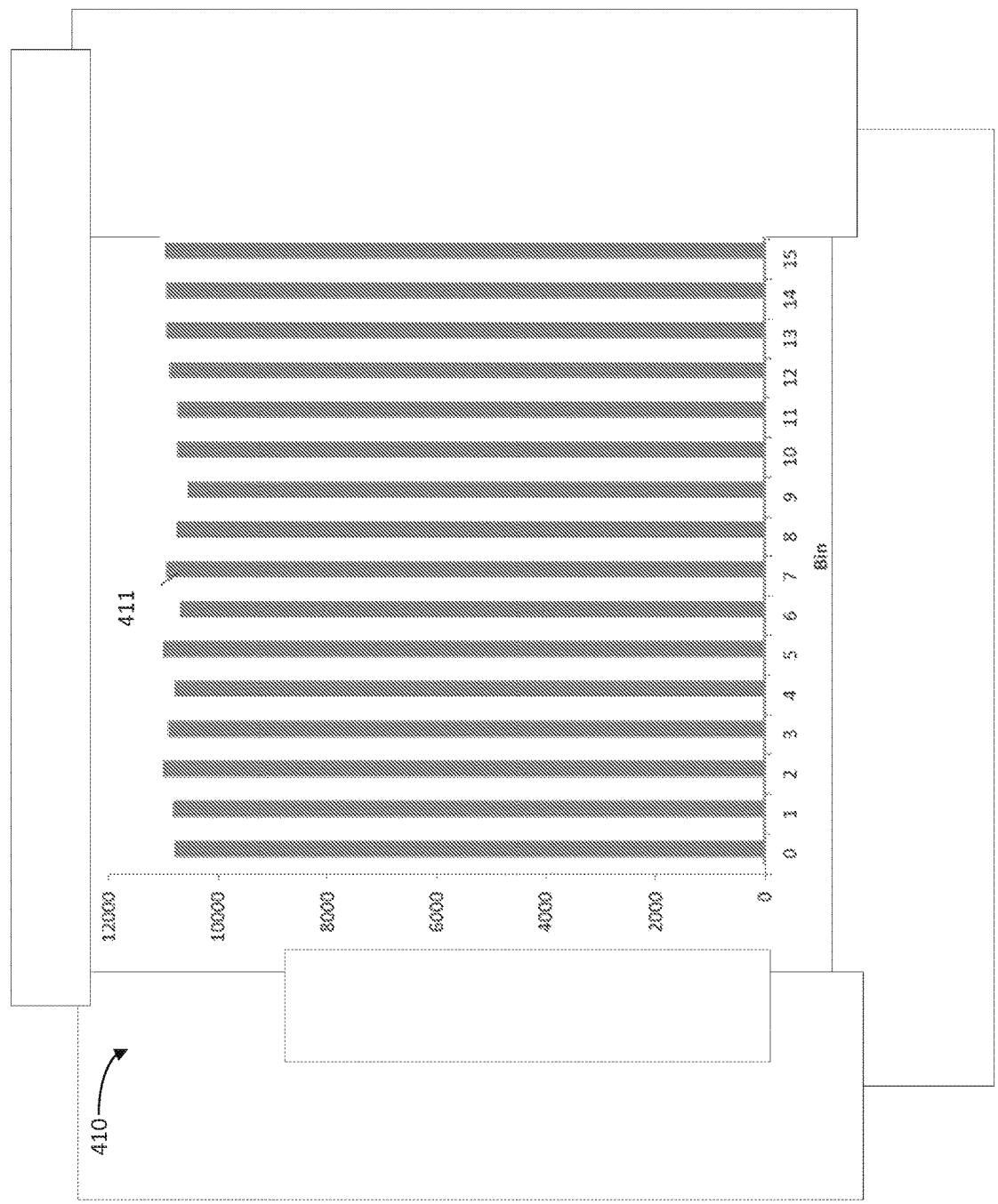
FIG. 8 illustrates an example histogram formed by a set of idle periods over a set of bins of a contention window, where the set of bins have equal durations, in accordance with various embodiments.

FIG. 8 illustrates an example histogram, e.g., a histogram 410, formed by a set of idle periods over a set of bins of a contention window, where the set of bins have equal durations, in accordance with various embodiments. In embodiments, an idle period of the set of idle period may be similar to the idle period 411 or the idle period 413 shown in FIG. 7. In embodiments, the idle periods may be obtained based on an operation flow, e.g., the operation flow 300 in FIG. 5 or the operation flow 310 in FIG. 6, performed by the test system 200 to test the device UUT 201, as shown in FIG. 2. In embodiments, the histogram 410 may be formed by a set of idle periods for a UE, e.g., the UE 151, the UE 153, and the UE 155 as shown in FIG. 1.

A test system, e.g., the test system 200, may test a UE and collect a plurality of occupied time intervals and non-occupied time intervals, and determine a set of idle periods for the medium. In addition, the test system may identify a set of bins in which a union of the set of bins may be equal to a contention window. In embodiments, each bin may be disjoint from another bin. For example, a contention window [0, CW] may be split into 16 bins, numbered as bins 0, 1, . . . , 15, where each bin represents a subinterval of the contention window [0, CW]. For example, a contention window [0, CW] may be [43, 178], and a bin may be any of the subinterval [43, 52[, [52, 61[, . . . [169, 178]. In embodiments, a subinterval of the contention window [0, CW] for a bin may have a lower bound and an upper bound. For example, a bin representing the subinterval [52, 61[ may have a lower bound 52 and an upper bound 61.

Afterwards, the individual idle periods of the set of idle periods may be assigned to individual bins of the set of bins, based on the duration of the individual idle periods. In embodiment, an idle period may be assigned to a bin when a duration of the idle period is larger than or equal to a lower bound of an interval included in the bin, and smaller than an upper bound of the interval included in the bin. After all idle periods of the set of idle periods have been assigned, the test system, e.g., the test system 200, may count a number of idle periods assigned to each individual bin of the set of bins.

Furthermore, the test system, e.g., the test system 200, may construct a histogram, e.g., the histogram 410, to represent the distribution of idle periods for the UE under test. The histogram 410 may be formed based on the idle periods assigned to individual bins. For example, for the bin 7, the bar 411 may represent the number of idle periods assigned to bin 7. In embodiments, there may be approximately equal number of idle periods assigned to each bin, while in total, the number of idle periods assigned to bins 0, 1, . . . , 15 may be greater than or equal to 15×10,000.

Figure 9:
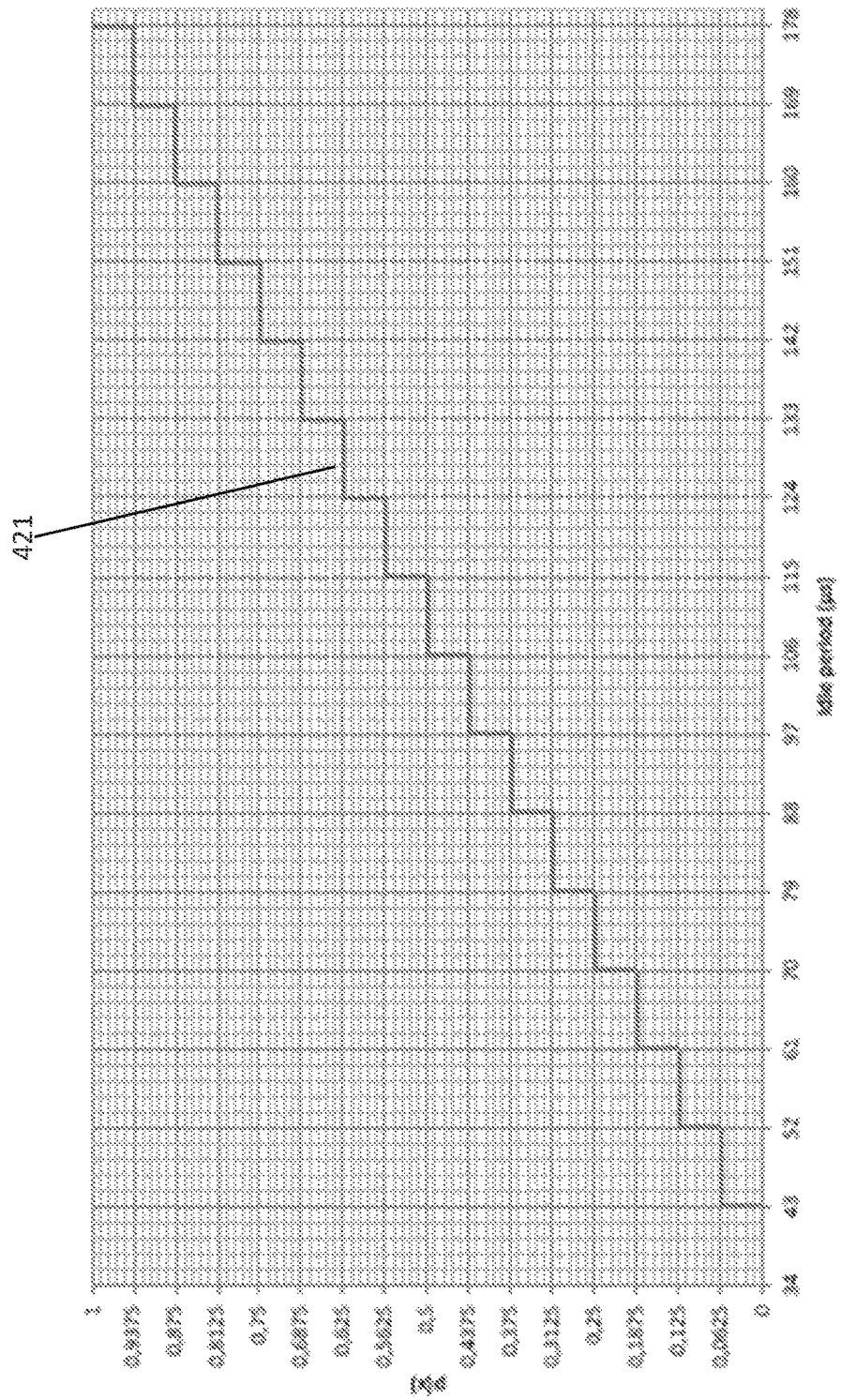
FIG. 9 illustrates an example cumulative distribution function (CDF) of a set of idle periods over a contention window, in accordance with various embodiments.

FIG. 9 illustrates an example cumulative distribution function (CDF), e.g., a CDF 421, of a set of idle periods over a contention window, in accordance with various embodiments. In embodiments, the CDF 421 may be constructed based on a set of idle periods, where an idle period of the set of idle periods may be similar to the idle period 411 or the idle period 413 shown in FIG. 7. In embodiments, the idle periods may be obtained based on an operation flow, e.g., the operation flow 300 in FIG. 5 or the operation flow 310 in FIG. 6, performed by the test system 200 to test the device UUT 201, as shown in FIG. 2. In embodiments, the CDF 421 may be formed by a set of idle periods for a UE, e.g., the UE 151, the UE 153, and the UE 155 as shown in FIG. 1.

In embodiments, a test system, e.g., the test system 200, may collect a plurality of occupied time intervals and non-occupied time intervals, and determine a set of idle periods for the medium within a contention window [0, CW]. In addition, the test system may identify a set of bins in which a union of the set of bins may be equal to the contention window. Afterwards, the individual idle periods of the set of idle periods may be assigned to individual bins of the set of bins, based on the duration of the individual idle periods. After all idle periods of the set of idle periods have been assigned, the test system may count a number of idle periods assigned to each individual bin of the set of bins.

Based on the number of idle periods assigned to each individual bin, the test system, e.g., the test system 200, may construct a CDF. As shown in FIG. 9, the set of idle periods may be within a contention window [0, 178 μs], where there is no idle period is within a bin, e.g., the interval [0, 43 μs[. In addition, the remaining contention window [43 μs, 178 μs] may be equally divided into 15 bins, where each bin has a duration of 9 μs. In mathematical notation, such a set of bins for the contention window may be denoted as follows:

$$B_n = \begin{cases} [0, 43[\mu s, & n = 0 \\ [43 + 9 \times (n-1), 43 + 9 \times n[\mu s, & 1 \leq n \leq 15, n \in \mathbb{N}_0 \\ [178, \infty[\mu s, & n = 16 \end{cases}$$

Other embodiments may have different bins defined on the contention windows. For example, the following lists a few different sets of bins.

$$B_n = \begin{cases} [0, 41[\mu s, & n = 0 \\ [41 + 9 \times (n-1), 41 + 9 \times n[\mu s, & 1 \leq n \leq 31 \\ [320, \infty[\mu s, & n = 32 \end{cases}$$

$$B_n = \begin{cases} [0, 41[\mu s, & n = 0 \\ [41 + 9 \times (n-1), 41 + 9 \times n[\mu s, & 1 \leq n \leq 15 \\ [176, \infty[\mu s, & n = 16 \end{cases}$$

$$B_n = \begin{cases} [0, 32[\mu s, & n = 0 \\ [32 + 9 \times (n-1), 32 + 9 \times n[\mu s, & 1 \leq n \leq 7 \\ [95, \infty[\mu s, & n = 8 \end{cases}$$

$$B_n = \begin{cases} [0, 23[\mu s, & n = 0 \\ [23 + 9 \times (n-1), 23 + 9 \times n[\mu s, & 1 \leq n \leq 7 \\ [86, \infty[\mu s, & n = 8 \end{cases}$$

Each bin may have an associated probability for allowed number of idle periods within the bin. For example, as shown in FIG. 9, the associated probability for each bin may be 0.0625, which represents the allowed number of idle periods assigned to the corresponding bin. The number of idle periods within each bin may be counted and compared based on the associated probability for each bin, to determine the UE has a pass status or a failure status.

Figure 10:
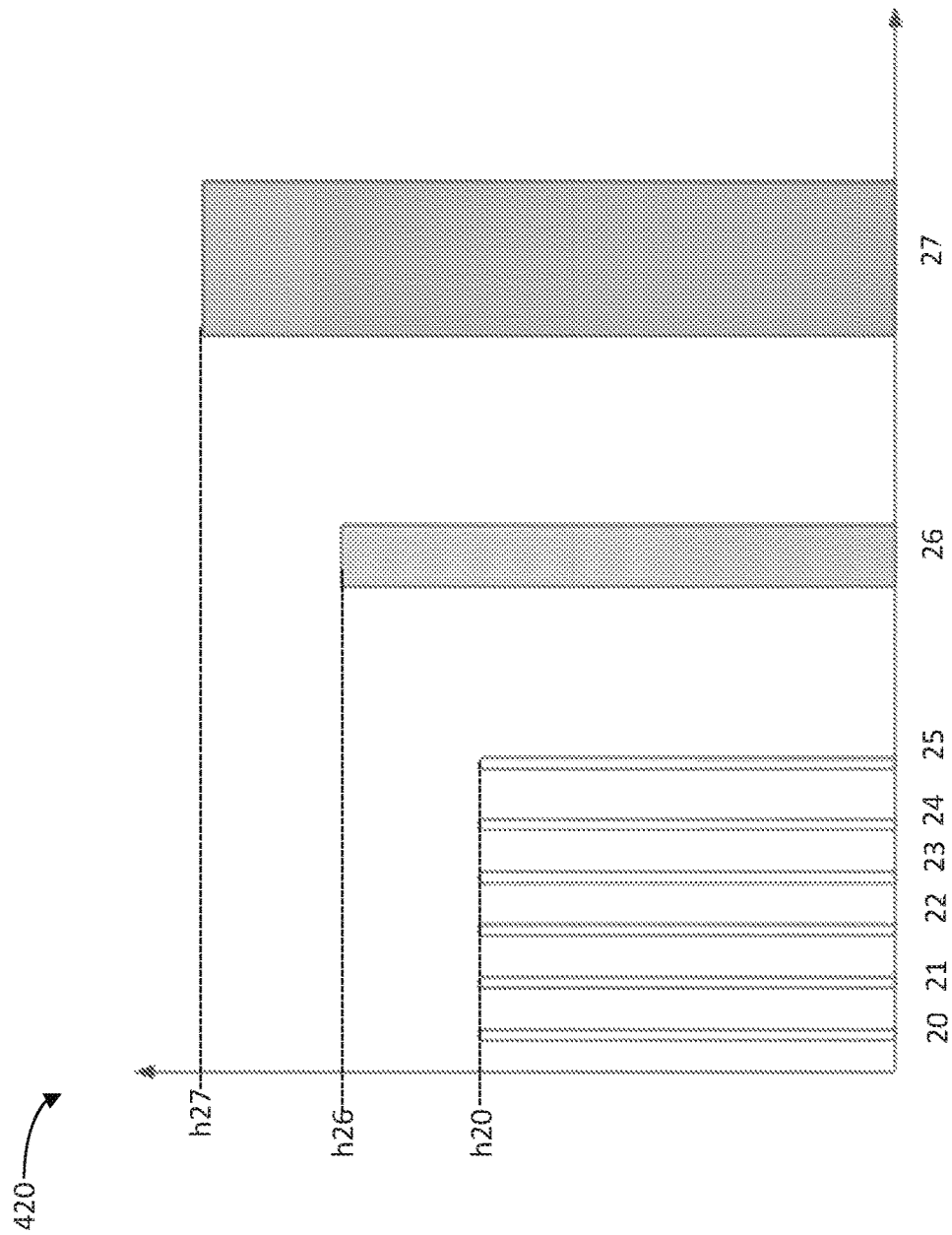
FIG. 10 illustrates another example histogram formed by a set of idle periods over a set of bins of a contention window, where the set of bins have unequal durations, in accordance with various embodiments.

FIG. 10 illustrates another example histogram, e.g., a histogram 420, formed by a set of idle periods over a set of bins of a contention window, where the set of bins have unequal durations, in accordance with various embodiments. In embodiments, histogram 420 may be constructed based on a set of idle periods, where an idle period of the set of idle periods may be similar to the idle period 411 or the idle period 13 shown in FIG. 7.

In embodiments, the idle periods may be obtained based on an operation flow, e.g., the operation flow 300 in FIG. 5 or the operation flow 310 in FIG. 6, performed by the test system 200 to test the device UUT 201, as shown in FIG. 2. In embodiments, the histogram 420 may be formed by a set of idle periods for a UE, e.g., the UE 151, the UE 153, and the UE 155 as shown in FIG. 1.

In embodiments, a test system, e.g., the test system 200, may collect a plurality of occupied time intervals and non-occupied time intervals, and determine a set of idle periods for the medium within a contention window [0, CW]. In addition, the test system may identify a set of bins in which a union of the set of bins may be equal to the contention window. Afterwards, the individual idle periods of the set of idle periods may be assigned to individual bins of the set of bins, based on the duration of the individual idle periods. After all idle periods of the set of idle periods have been assigned, the test system may count a number of idle periods assigned to each individual bin of the set of bins. Furthermore, a histogram, e.g., the histogram 420, may be constructed based on the assignments of individual bins of the set of bins to represent the distribution of idle periods.

In embodiments, the contention window [0, CW] may be split into a bin 20, a bin 21, a bin 22, a bin 23, a bin 24, a bin 25, a bin 26, and a bin 27. The number of bins is for example only, and there may be other number of bins. The bin 20, the bin 21, the bin 22, the bin 23, the bin 24, and the bin 25, may have equal duration, while the bin 26 and the bin 27 may have a different duration. For example, the bin 26 may have duration longer than any of the bin 20, the bin 21, the bin 22, the bin 23, the bin 24, and the bin 25, and the bin 27 may have duration longer than the bin 26.

A bar with a height on a bin may represent the number of idle period assigned to the bin. For example, the bin 20, the bin 21, the bin 22, the bin 23, the bin 24, and the bin 25 may have a height h20, the bin 26 may have a height 26, and the bin 27 may have a height 27. In embodiments, the height h26 may be larger than the height h20, and the height h27 may be larger than the height h26. In terms of associated probabilities, the bin 26 may have a first associated probability, and the bin 27 may have a second associated probability that is larger than the first associated probability for the bin 26.

Figure 11:
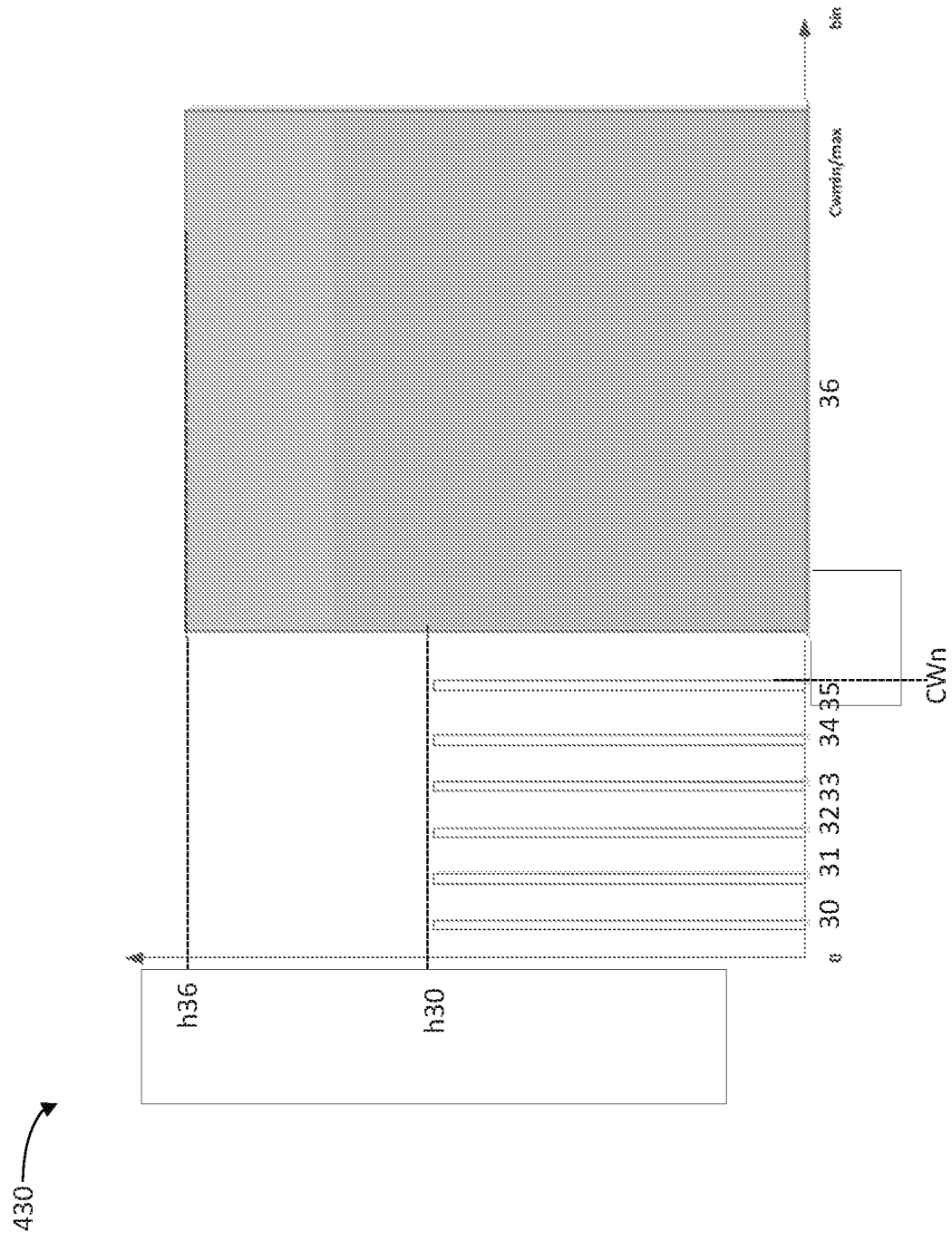
FIG. 11 illustrates another example histogram formed by a set of idle periods over a set of bins of a contention window, where the set of bins have unequal durations, in accordance with various embodiments.

FIG. 11 illustrates another example histogram, e.g., a histogram 430, formed by a set of idle periods over a set of bins of a contention window, where the set of bins have unequal durations, in accordance with various embodiments. In embodiments, histogram 430 may be constructed based on a set of idle periods, where an idle period of the set of idle periods may be similar to the idle period 411 or the idle period 413 shown in FIG. 7. In embodiments, the idle periods may be obtained based on an operation flow, e.g., the operation flow 300 in FIG. 5 or the operation flow 310 in FIG. 6, performed by the test system 200 to test the device UUT 201, as shown in FIG. 2. In embodiments, the histogram 430 may be formed by a set of idle periods for a UE, e.g., the UE 151, the UE 153, and the UE 155 as shown in FIG. 1.

In embodiments, a test system, e.g., the test system 200, may collect a plurality of occupied time intervals and non-occupied time intervals, and determine a set of idle periods for the medium within a contention window [0, CWmin/max]. In addition, the test system may identify a set of bins in which a union of the set of bins may be equal to the contention window. Afterwards, the individual idle periods of the set of idle periods may be assigned to individual bins of the set of bins, based on the duration of the individual idle periods. After all idle periods of the set of idle periods have been assigned, the test system may count a number of idle periods assigned to each individual bin of the set of bins. Furthermore, a histogram, e.g., the histogram 430, may be constructed based on the assignments of individual bins of the set of bins to represent the distribution of idle periods.

In embodiments, the contention window [0; CWmin/max] may be split into a bin 30, a bin 31, a bin 32, a bin 33, a bin 34, a bin 35, and a bin 36. The number of bins is for example only, and there may be other number of bins. The contention window [0; CWmin/max] may be split into two subintervals [0; CWn] and [CWn; CWmin/max], where CWn=½ CWmin/max. The bin 36 may represent the subinterval [CWn; CWmin/max], and the subinterval [0; CWn] may be further split into the bin 30, the bin 31, the bin 32, the bin 33, the bin 34, and the bin 35, with equal duration.

A bar with a height on a bin may represent the number of idle period assigned to the bin. For example, the bin 30, the bin 31, the bin 32, the bin 33, the bin34, and the bin 35 may have a height h30, and the bin 36 may have a height h36. In embodiments, the height h36 may be larger than the height h20. In terms of associated probabilities, the bin 30 may have a first associated probability, and the bin 36 may have a second associated probability that is larger than the first associated probability.

Figure 12:
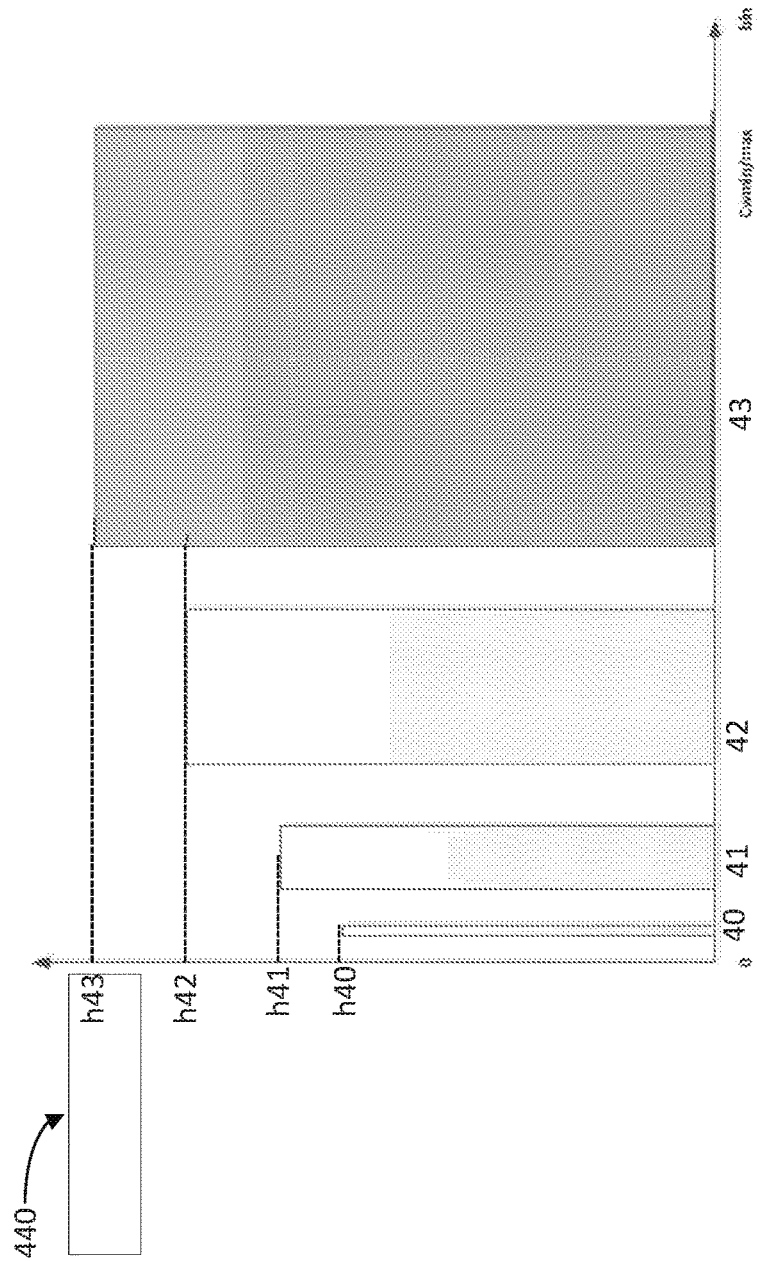
FIG. 12 illustrates another example histogram formed by a set of idle periods over a set of bins of a contention window, where the set of bins have unequal durations, in accordance with various embodiments.

FIG. 12 illustrates another example histogram, e.g., a histogram 440, formed by a set of idle periods over a set of bins of a contention window, where the set of bins have unequal durations, in accordance with various embodiments. In embodiments, histogram 440 may be constructed based on a set of idle periods, where an idle period of the set of idle periods may be similar to the idle period 411 or the idle period 413 shown in FIG. 7. In embodiments, the idle periods may be obtained based on an operation flow, e.g., the operation flow 300 in FIG. 5 or the operation flow 310 in FIG. 6, performed by the test system 200 to test the device UUT 201, as shown in FIG. 2. In embodiments, the histogram 440 may be formed by a set of idle periods for a UE, e.g., the UE 151, the UE 153, and the UE 155 as shown in FIG. 1.

In embodiments, a test system, e.g., the test system 200, may collect a plurality of occupied time intervals and non-occupied time intervals, and determine a set of idle periods for the medium within a contention window [0, CWmin/max]. In addition, the test system may identify a set of bins in which a union of the set of bins may be equal to the contention window. Afterwards, the individual idle periods of the set of idle periods may be assigned to individual bins of the set of bins, based on the duration of the individual idle periods. After all idle periods of the set of idle periods have been assigned, the test system may count a number of idle periods assigned to each individual bin of the set of bins. Furthermore, a histogram, e.g., the histogram 440, may be constructed based on the assignments of individual bins of the set of bins to represent the distribution of idle periods.

In embodiments, the contention window [0; CWmin/max] may be split into a bin 40, a bin 41, a bin 42, and a bin 43. The number of bins is for example only, and there may be other number of bins. The bin 40, the bin 41, the bin, and the bin 43 may each have a different duration. Furthermore, the durations may increase monotonically. For example, the bin 43 may have a duration larger than the bin 42, which may have a duration larger than the bin 41, and so on.

A bar with a height on a bin may represent the number of idle period assigned to the bin. For example, the bin 40, the bin 41, the bin 42, and the bin 43 may have a height h40, a height h41, a height h42, and a height h43, respectively. In embodiments, the height h43 may be larger than the height h42. In terms of associated probabilities, the bin 42 may have a first associated probability, and the bin 43 may have a second associated probability that is larger than the first associated probability.

Figure 13:
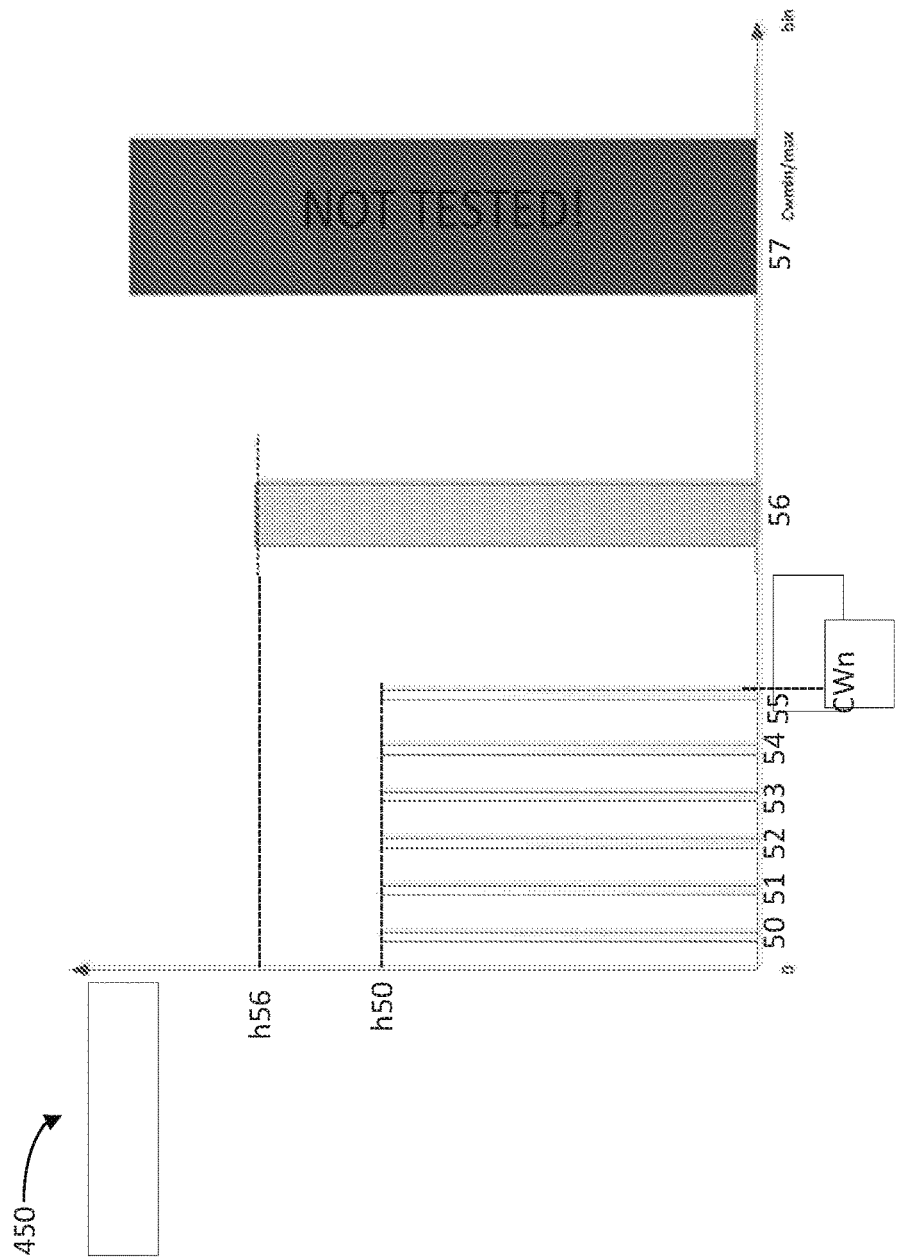
FIG. 13 illustrates another example histogram formed by a set of idle periods over a set of bins of a contention window, where the set of bins have unequal durations, in accordance with various embodiments.

FIG. 13 illustrates another example histogram, e.g., a histogram 450, formed by a set of idle periods over a set of bins of a contention window, where the set of bins have unequal durations, in accordance with various embodiments. In embodiments, histogram 450 may be constructed based on a set of idle periods, where an idle period of the set of idle periods may be similar to the idle period 411 or the idle period 413 shown in FIG. 7. In embodiments, the idle periods may be obtained based on an operation flow, e.g., the operation flow 300 in FIG. 5 or the operation flow 310 in FIG. 6, performed by the test system 200 to test the device UUT 201, as shown in FIG. 2. In embodiments, the histogram 450 may be formed by a set of idle periods for a UE, e.g., the UE 151, the UE 153, and the UE 155 as shown in FIG. 1.

In embodiments, a test system, e.g., the test system 200, may collect a plurality of occupied time intervals and non-occupied time intervals, and determine a set of idle periods for the medium within a contention window [0, CWmin/max]. In addition, the test system may identify a set of bins in which a union of the set of bins may be equal to the contention window. Afterwards, the individual idle periods of the set of idle periods may be assigned to individual bins of the set of bins, based on the duration of the individual idle periods. After all idle periods of the set of idle periods have been assigned, the test system may count a number of idle periods assigned to each individual bin of the set of bins. Furthermore, a histogram, e.g., the histogram 450, may be constructed based on the assignments of individual bins of the set of bins to represent the distribution of idle periods.

In embodiments, the contention window [0; CWmin/max] may be split into two subintervals [0; CWn] and [CWn; CWmin/max], where CWn=½ CWmin/max. The subinterval [0; CWn] may be further split into a bin 50, a bin 51, a bin 52, a bin 53, a bin 54, and a bin 55, with equal duration. Furthermore, the subinterval [CWn; CWmin/max] may be split into a bin 56 and a bin 57. The number of bins is for example only, and there may be other number of bins.

A bar with a height on a bin may represent the number of idle period assigned to the bin. For example, the bin 50, the bin 51, the bin 52, the bin 53, the bin 54, and the bin 55 may have a height h50, and the bin 56 may have a height h 56. On the other hand, the bin 57 may be any height, which means that the idle periods assigned to the bin 57 would not make any difference in the testing of the UE. The UE may have a pass or failure status regardless of the number of idle periods assigned to the bin 57.

Figure 14:
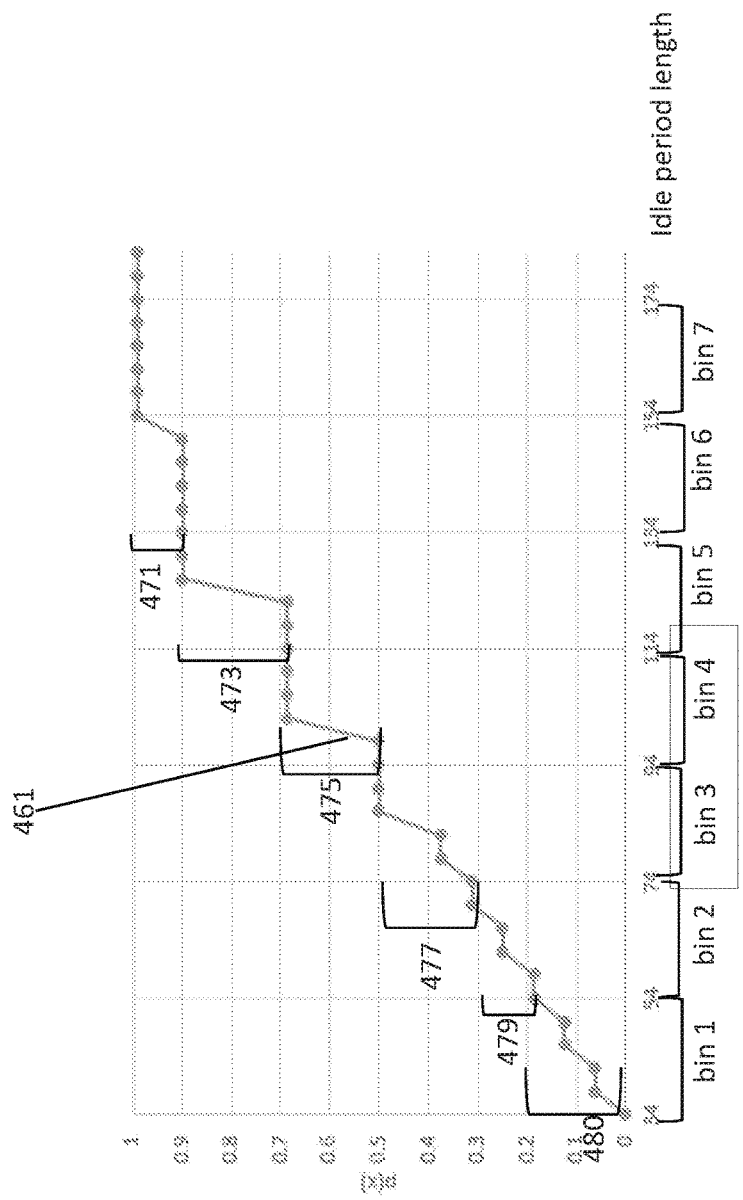
FIG. 14 illustrates an example CDF specifying a distribution of a set of idle periods over a contention window, in accordance with various embodiments.

FIG. 14 illustrates an example CDF, e.g., a CDF 461, specifying a distribution of a set of idle periods over a contention window, in accordance with various embodiments. In embodiments, the CDF 461 may specify a distribution of a set of idle periods, where an idle period of the set of idle periods may be similar to the idle period 411 or the idle period 413 shown in FIG. 7. In embodiments, the idle periods may be obtained based on an operation flow, e.g., the operation flow 300 in FIG. 5 or the operation flow 310 in FIG. 6, performed by the test system 200 to test the device UUT 201, as shown in FIG. 2. In embodiments, the CDF 461 may be used to analyze a set of idle periods for a UE, e.g., the UE 151, the UE 153, and the UE 155 as shown in FIG. 1.

As shown, the contention window [34 μs, 174 μs] may be split into 7 bins, a bin 1 for interval [34 μs, 54 μs[, a bin 2 for interval [54 μs, 74 μs [, a bin 3 for interval [74 μs, 94 μs [, a bin 4 for interval [94 μs, 114 μs [, a bin 5 for interval [114 μs, 134 μs [, a bin 6 for interval [134 μs, 154 μs [, and a bin 7 for interval [154 μs, 174 μ]. Furthermore, each bin has an associated probabilities. For example, the bin 1 has an associate probability 480 with a value 0.2, the bin 2 has an associate probability 479 with a value 0.1, the bin 3 has an associate probability 477 with a value 0.2, the bin 4 has an associate probability 475 with a value 0.2, the bin 5 has an associate probability 473 with a value 0.2, the bin 6 has an associate probability 471 with a value 0.1, and the bin 7 has an associate probability as 0.

In mathematical notation, the set of bins can be denoted as the following:

$$B_n = \begin{cases} [0, 34[\mu s, & n = 0 \\ [34 + 20*(n-1), 34 + 20*n]\mu s, & 1 \leq n \leq 7 \\ [174, \infty[\mu s, & n = 8 \end{cases}$$

Similarly, the associated probability for each bin of the set of bins listed above can be denoted as follows:

$$P_n = \begin{cases} 0 & n = 0 \\ \leq 0.2 & n = 1 \\ \leq 0.1 & n = 2 \\ \leq 0.2 & n = 3, 4, 5 \\ \leq 0.1 & n = 6 \\ 0 & n = 7 \end{cases}$$

Hence, the bin 3 may have an associated probability 0.2, and the bin 6 and the bin 2 may have an associated probability 0.1 that is smaller than the associated probability for bin 3.

Accordingly, the cumulative probability for each bin may be specified as follows:

$$P(n) \leq \begin{cases} 0 & n = 0 \\ 0.2 & n = 1 \\ 0.3 & n = 2 \\ 0.3 + (n-2)*0.2 & n = 3, 4, 5 \\ 1 & n \geq 6 \end{cases}$$

Other embodiments may have different bins defined on the contention windows with different associated probabilities and cumulative probabilities. For example, the following lists a few different sets of bins with different associated probabilities, which leads to different cumulative probabilities.

$$p(n) \leq \begin{cases} 0, 05, & n = 0 \\ 0, 18, & n = 1 \\ 0, 18 + (n-1) \times 0, 125, & 2 \leq n \leq 6 \\ 1, & n > 6 \end{cases}$$

$$p(n) \leq \begin{cases} 0, 05, & n = 0 \\ 0, 12, & n = 1 \\ 0, 12 + (n-1) \times 0, 03125, & 2 \leq n \leq 29 \\ 1, & n > 29 \end{cases}$$

$$p(n) \leq \begin{cases} 0, 05, & n = 0 \\ 0, 12, & n = 1 \\ 0, 12 + (n-1) \times 0, 0625, & 2 \leq n \leq 15 \\ 1, & n > 15 \end{cases}$$

$$p(n) \leq \begin{cases} 0, 05, & n = 0 \\ 0, 09 + (n-1) \times 0, 03125, & 1 \leq n \leq 7 \\ 0, 59 + (n-1) \times 0, 03125, & 8 \leq n \leq 14 \\ 1, & n > 14 \end{cases}$$

In embodiments, a test system, e.g., the test system 200, may collect a plurality of occupied time intervals and non-occupied time intervals, and determine a set of idle periods for the medium within a contention window [0, CWmin/max], e.g., [0, 174]. As shown above, the contention [0, 174] may be split into seven 7 bins with associated probabilities, specified by the CDF shown in FIG. 14. Individual idle periods of the set of idle periods may be assigned to individual bins of the 7 bins for the contention window [0, 174], based on the duration of the individual idle periods. After all idle periods of the set of idle periods have been assigned, the test system may count a number of idle periods assigned to each individual bin of the 7 bins. A CDF for the idle periods may be constructed based on the number of idle periods assigned to each bin. In embodiments, the UE may have a pass status if every point of the CDF constructed based on the idle periods for the UE is below the CDF specified in FIG. 14. In other words, the CDF constructed based on the idle periods for the UE meets the CDF 461 or is to the right of the CDF 461.

The test system, e.g., the test system 200, may determine that the UE has a pass status or a failure status based on the number of idle periods assigned to each individual bin of the set of bins, and the associated probability for each individual bin of the set of bins. For example, the test system 200, may determine that the UE has a pass status when a probability calculated for each individual bin of the set of bins based on the number of idle periods assigned to each individual bin is smaller than or equal to the associated probability for each individual bin of the set of bins.

On the other hand, the test system 200, may determine that the UE has a failure status when an occupied period for the medium has duration larger than a predetermined occupancy duration, e.g., 6 ms. The test system 200, may determine that the UE has a failure status when a probability calculated for a bin of the set of bins based on a number of idle periods assigned to the bin is larger than an associated probability for the bin.

Figure 15:
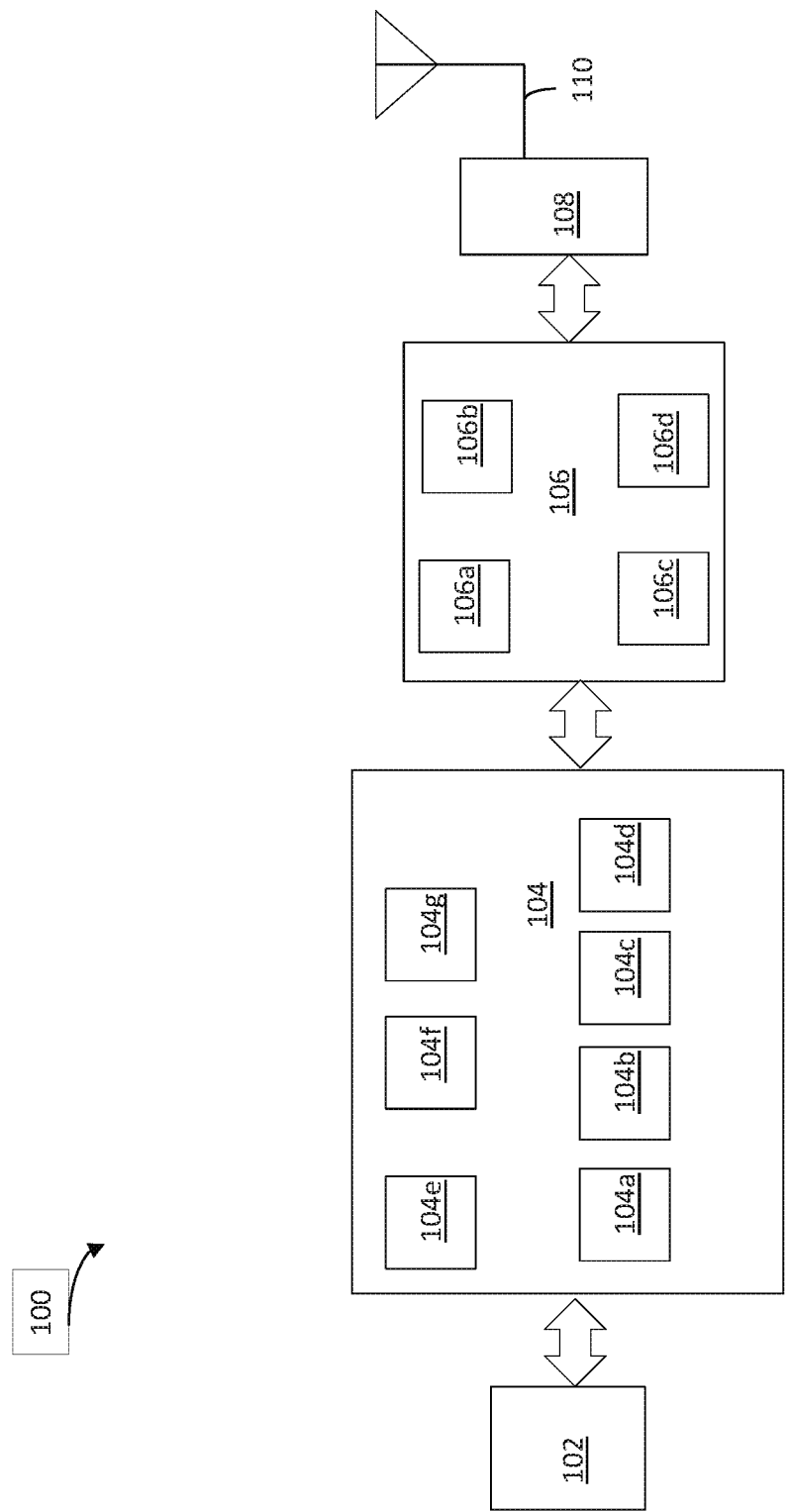
FIG. 15 illustrates a block diagram of an electronic device that implements eNBs, access points (APs), and/or UEs, in accordance with various embodiments.

FIG. 15 illustrates a block diagram of an electronic device, e.g., an electronic device 100, that implements eNBs, APs, and/or UEs, in accordance with various embodiments. In one embodiment, using any suitably configured hardware and/or software, example components of an electronic device 100 may implement an eNB, an AP, or a UE of the network 150 as shown in FIG. 1. In addition, the electronic device 100 may implement a device under test (DUT), e.g., the UUT 201 as shown in FIG. 4, a piece of testing equipment such as a testing device, e.g., the tester 207, and/or some other electronic device. In some embodiments, the electronic device 100 may include application circuitry 102, baseband circuitry 104, radio frequency (RF) circuitry 106, front-end module (FEM) circuitry 108, and one or more antennas 120, coupled together at least as shown. In embodiments where the electronic device 100 is implemented in or by an eNB, the electronic device 100 may also include network interface circuitry (not shown) for communicating over a wired interface (for example, an X2 interface, an S1 interface, and the like).

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The application circuitry 102 may include one or more application processors. For example, the application circuitry 102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 104 may include circuitry such as, but not limited to, one or more single-core or multi-core processors. The baseband circuitry 104 may include one or more baseband processors and/or control logic to process baseband signals received from a receive signal path of the RF circuitry 106 and to generate baseband signals for a transmit signal path of the RF circuitry 106. Baseband processing circuity 104 may interface with the application circuitry 102 for generation and processing of the baseband signals and for controlling operations of the RF circuitry 106. For example, in some embodiments, the baseband circuitry 104 may include a second generation (2G) baseband processor 104a, third generation (3G) baseband processor 104b, fourth generation (4G) baseband processor 104c, and/or other baseband processor(s) 104d for other existing generations, generations in development or to be developed in the future (e.g., fifth generation (5G), 6G, etc.). The baseband circuitry 104 (e.g., one or more of baseband processors 104a-d) may handle various radio control functions that enable communication with one or more radio networks via the RF circuitry 106. The radio control functions may include, but are not limited to, signal modulation/demodulation, encoding/decoding, radio frequency shifting, etc. In some embodiments, modulation/demodulation circuitry of the baseband circuitry 104 may include Fast-Fourier Transform (FFT), precoding, and/or constellation mapping/demapping functionality. In some embodiments, encoding/decoding circuitry of the baseband circuitry 104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 104 may include elements of a protocol stack such as, for example, elements of an D2D or evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 104e of the baseband circuitry 104 may be configured to run elements of the protocol stack for signaling of the PHY, MAC, RLC, PDCP and/or RRC layers. In some embodiments, the baseband circuitry may include one or more audio digital signal processor(s) (DSP) 104f. The audio DSP(s) 104f may be include elements for compression/decompression and echo cancellation and may include other suitable processing elements in other embodiments.

The baseband circuitry 104 may further include memory/storage 104g. The memory/storage 104g may be used to load and store data and/or instructions for operations performed by the processors of the baseband circuitry 104. Memory/storage for one embodiment may include any combination of suitable volatile memory and/or non-volatile memory. The memory/storage 104g may include any combination of various levels of memory/storage including, but not limited to, read-only memory (ROM) having embedded software instructions (e.g., firmware), random access memory (e.g., dynamic random access memory (DRAM)), cache, buffers, etc. The memory/storage 104g may be shared among the various processors or dedicated to particular processors.

Components of the baseband and circuitry may be suitably combined in a single chip, a single chipset, or disposed on a same circuit board in some embodiments. In some embodiments, some or all of the constituent components of the baseband circuitry 104 and the application circuitry 102 may be implemented together such as, for example, on a system on a chip (SOC).

In some embodiments, the baseband circuitry 104 may provide for communication compatible with one or more radio technologies. For example, in some embodiments, the baseband circuitry 104 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 104 is configured to support radio communications of more than one wireless protocol may be referred to as multi-mode baseband circuitry.

RF circuitry 106 may enable communication with wireless networks using modulated electromagnetic radiation through a non-solid medium. In various embodiments, the RF circuitry 106 may include switches, filters, amplifiers, etc. to facilitate the communication with the wireless network. RF circuitry 106 may include a receive signal path which may include circuitry to down-convert RF signals received from the FEM circuitry 108 and provide baseband signals to the baseband circuitry 104. RF circuitry 106 may also include a transmit signal path which may include circuitry to up-convert baseband signals provided by the baseband circuitry 104 and provide RF output signals to the FEM circuitry 108 for transmission.

In some embodiments, the RF circuitry 106 may include a receive signal path and a transmit signal path. The receive signal path of the RF circuitry 106 may include mixer circuitry 106a, amplifier circuitry 106b and filter circuitry 106c. The transmit signal path of the RF circuitry 106 may include filter circuitry 106c and mixer circuitry 106a. RF circuitry 106 may also include synthesizer circuitry 106d for synthesizing a frequency for use by the mixer circuitry 106a of the receive signal path and the transmit signal path. In some embodiments, the mixer circuitry 106a of the receive signal path may be configured to down-convert RF signals received from the FEM circuitry 108 based on the synthesized frequency provided by synthesizer circuitry 106d. The amplifier circuitry 106b may be configured to amplify the down-converted signals and the filter circuitry 106c may be a low-pass filter (LPF) or band-pass filter (BPF) configured to remove unwanted signals from the down-converted signals to generate output baseband signals. Output baseband signals may be provided to the baseband circuitry 104 for further processing. In some embodiments, the output baseband signals may be zero-frequency baseband signals, although this is not a requirement. In some embodiments, mixer circuitry 106a of the receive signal path may comprise passive mixers, although the scope of the embodiments is not limited in this respect.

In some embodiments, the mixer circuitry 106a of the transmit signal path may be configured to up-convert input baseband signals based on the synthesized frequency provided by the synthesizer circuitry 106d to generate RF output signals for the FEM circuitry 108. The baseband signals may be provided by the baseband circuitry 104 and may be filtered by filter circuitry 106c. The filter circuitry 106c may include a low-pass filter (LPF), although the scope of the embodiments is not limited in this respect.

In some embodiments, the mixer circuitry 106a of the receive signal path and the mixer circuitry 106a of the transmit signal path may include two or more mixers and may be arranged for quadrature downconversion and/or upconversion respectively. In some embodiments, the mixer circuitry 106a of the receive signal path and the mixer circuitry 106a of the transmit signal path may include two or more mixers and may be arranged for image rejection (e.g., Hartley image rejection). In some embodiments, the mixer circuitry 106a of the receive signal path and the mixer circuitry 106a may be arranged for direct downconversion and/or direct upconversion, respectively. In some embodiments, the mixer circuitry 106a of the receive signal path and the mixer circuitry 106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 106 may include analog-to-digital converter (ADC) and digital-to-analog converter (DAC) circuitry and the baseband circuitry 104 may include a digital baseband interface to communicate with the RF circuitry 106.

In some embodiments, the synthesizer circuitry 106d may be a fractional-N synthesizer or a fractional N/N+1 synthesizer, although the scope of the embodiments is not limited in this respect as other types of frequency synthesizers may be suitable. For example, synthesizer circuitry 106d may be a delta-sigma synthesizer, a frequency multiplier, or a synthesizer comprising a phase-locked loop with a frequency divider.

The synthesizer circuitry 106d may be configured to synthesize an output frequency for use by the mixer circuitry 106a of the RF circuitry 106 based on a frequency input and a divider control input. In some embodiments, the synthesizer circuitry 106d may be a fractional N/N+1 synthesizer.

In some embodiments, frequency input may be provided by a voltage controlled oscillator (VCO), although that is not a requirement. Divider control input may be provided by either the baseband circuitry 104 or the applications processor 102 depending on the desired output frequency. In some embodiments, a divider control input (e.g., N) may be determined from a look-up table based on a channel indicated by the applications processor 102.

Synthesizer circuitry 106d of the RF circuitry 106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 106 may include an IQ/polar converter.

FEM circuitry 108 may include a receive signal path which may include circuitry configured to operate on RF signals received from one or more antennas 110, amplify the received signals and provide the amplified versions of the received signals to the RF circuitry 106 for further processing. FEM circuitry 108 may also include a transmit signal path which may include circuitry configured to amplify signals for transmission provided by the RF circuitry 106 for transmission by one or more of the one or more antennas 110.

In some embodiments, the FEM circuitry 108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 106). The transmit signal path of the FEM circuitry 108 may include a power amplifier (PA) to amplify input RF signals (e.g., provided by RF circuitry 106), and one or more filters to generate RF signals for subsequent transmission (e.g., by one or more of the one or more antennas 110).

In some embodiments, the electronic device 100 may include additional elements such as, for example, a display, a camera, one or more sensors, and/or interface circuitry (for example, input/output (I/O) interfaces or buses) (not shown). In embodiments where the electronic device is implemented in or by an eNB, the electronic device 100 may include network interface circuitry. The network interface circuitry may be one or more computer hardware components that connect electronic device 100 to one or more network elements, such as one or more servers within a core network or one or more other eNBs via a wired connection. To this end, the network interface circuitry may include one or more dedicated processors and/or field programmable gate arrays (FPGAs) to communicate using one or more network communications protocols such as X2 application protocol (AP), S1 AP, Stream Control Transmission Protocol (SCTP), Ethernet, Point-to-Point (PPP), Fiber Distributed Data Interface (FDDI), and/or any other suitable network communications protocols.

Figure 16:
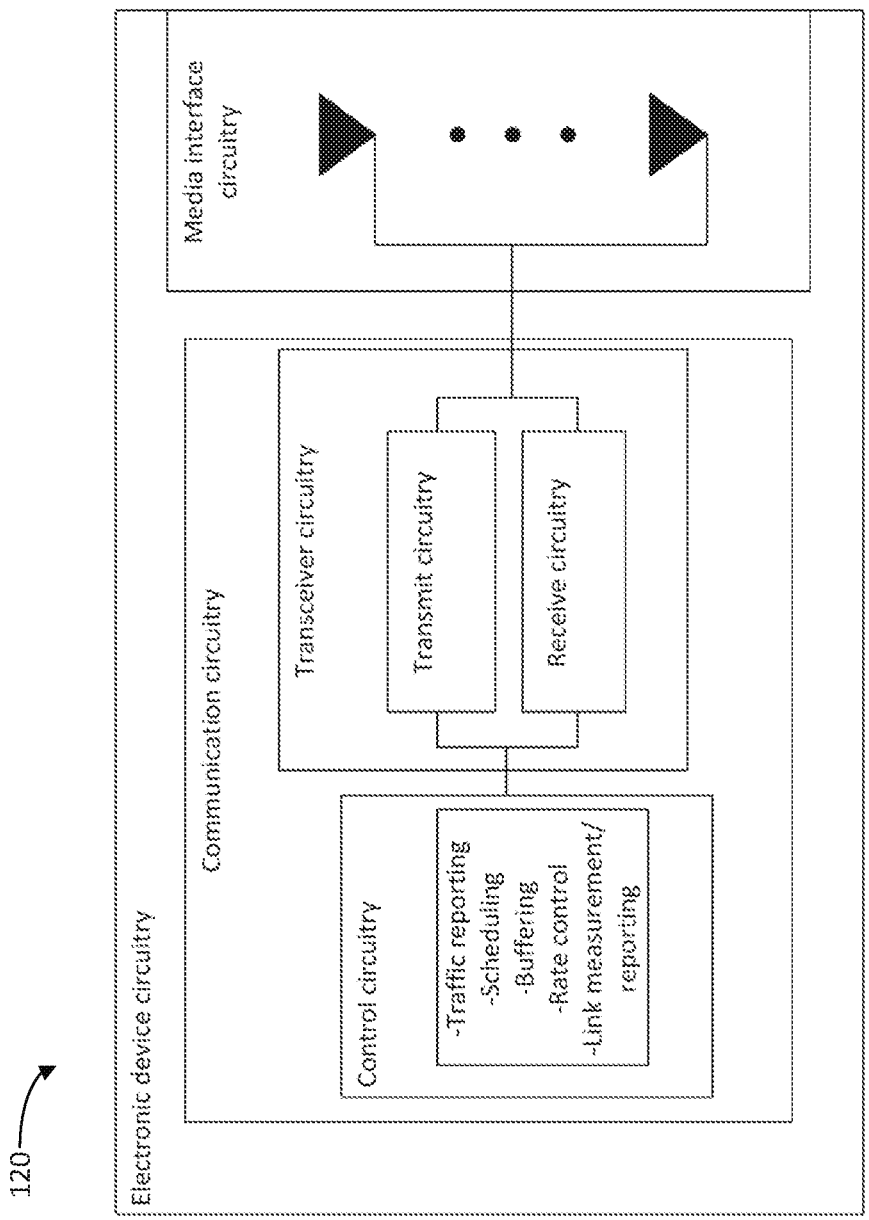
FIG. 16 illustrates a block diagram of an electronic device circuitry for testing a UE in a wireless system for idle period distribution, in accordance with various embodiments.

FIG. 16 illustrates a block diagram of an electronic device circuitry, e.g., a circuitry 120, for testing a UE in a wireless system for idle period distribution, in accordance with various embodiments. In embodiments, the circuitry 120 may be, may implement, may be incorporated into, or may otherwise be a part of, a testing device, e.g., the tester 207 in FIG. 4.

In embodiments, the electronic device circuitry may include communication circuitry. The communication circuitry may include control circuitry, transceiver circuitry that includes both transmit circuitry and receive circuitry, and media interface circuitry.

The media interface circuitry may include circuit elements that are configured to communicatively couple the transceiver circuitry with a wired or wireless communication medium. In some embodiments, the media interface circuitry may include radio frequency front-end components that may include one or more antenna elements, as generally shown (for transmission/reception of signals over a wireless medium), amplifiers, filters, etc. In other embodiments, the media interface circuitry may include components for interfacing with other networks. For example, in some embodiments, the media interface circuitry may include an Ethernet interface, for example, ports or other media interfaces such as, but not limited to, coaxial, twisted pair, or fiber-optic physical media interfaces.

The transceiver circuitry may couple the control circuitry with the media interface circuitry. The transceiver circuitry may receive signals from the control circuitry and perform various signal processing functions to prepare the signals for transmission over an appropriate communication medium by the media interface circuitry. The transceiver circuitry may also receive signals from the media interface circuitry and perform various signal processing functions to prepare the signals for transmission to the control circuitry.

In embodiments in which the electronic device circuitry interfaces with a wireless communication media of, for example, the Uu interface, the communication circuitry may include radio-frequency, mixed-signal, and analog portions and a baseband portion that uses one or more digital signal processors (DSPs) and communication algorithm processing including channel codes.

In embodiments in which the electronic device circuitry interfaces with a wired communication medium of, for example, the S1, X2, or S5/S8 interfaces, the communication circuitry may provide signal processing according to the appropriate communication network protocols. For example, the communication circuitry may include an Ethernet controller that implements Ethernet protocols of, for example, 10 Gigabit Ethernet, 1000BASE-T, 100BASE-TX, or 10BASE-T standards.

The control circuitry may include circuitry to perform link layer (for example, media access control (MAC) layer) and higher-layer operations to facilitate communication over appropriate networks. In some embodiments, digital physical layer (PHY) operations may be performed by the control circuitry, as well, with analog PHY operations being performed by the transceiver circuitry.

The control circuitry may operate to reduce radio channel capacity fluctuation in communications made between the core network and the UE. The control circuitry may perform various access-network control operations to enable opportunistic access of communication links in a high-frequency band in a manner to reduce radio channel capacity fluctuation and provide reliable communication over the air interface. In particular, the access-network control operations may include traffic reporting, scheduling, buffering/caching, traffic shaping, rate control, etc.

In some embodiments, the control circuitry may include a variety of circuitry including, for example, processing and memory circuitry, to perform the operations described herein. In some embodiments, the control circuitry may implement a mobile proxy to provide access-network control operations.

In some embodiments, the electronic devices of FIG. 15 and FIG. 16 may include circuitry to: identify a first contention window related to a first back-off (idle) time of a CSMA/CA frame based on a value of n that is equal to ½ CWmin/max; and identify a second contention window related to a second and a third back-off (idle) time of the CSMA/CA frame based on the value of n, wherein the second contention window is larger than the first contention window; and may further include circuitry to perform a first number of measurements of the first contention window.

Figure 17:
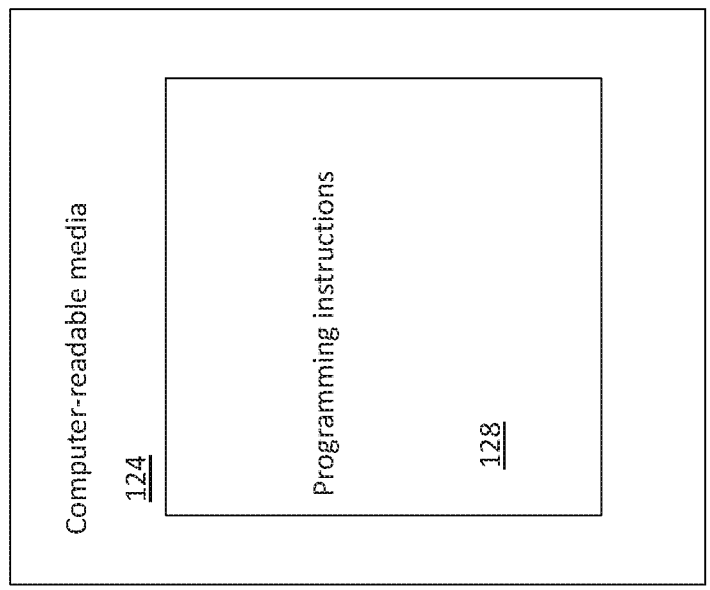
FIG. 17 illustrates an example computer-readable media, in accordance with various embodiments.

FIG. 17 illustrates an example computer-readable media 124 in accordance with some embodiments. In embodiments, the computer-readable media 124 may be suitable for use to store instructions that cause an apparatus, in response to execution of the instructions by the apparatus, to practice selected aspects of the present disclosure. In some embodiments, the computer-readable media 124 may be non-transitory. As shown, computer-readable storage medium 124 may include programming instructions 128.

Programming instructions 128 may be configured to enable a device, for example, the electronic device 100 shown in FIG. 15, the circuitry 120 as shown in FIG. 16, a UE such as the UE 151, the UE 153, the UE 155, an eNB such as the eNB 157, and an AP such as the AP 159, as shown in FIG. 1, or another device, such as the tester 207 in FIG. 4, in response to execution of the programming instructions 128, to implement (aspects of) any of the operation flows or elements described throughout this disclosure related to test a UE for idle period distribution, such as the operation flow 300 in FIG. 5, or the operation flow 310 in FIG. 6. In some embodiments, programming instructions 128 may be disposed on computer-readable media 124 that is transitory in nature, such as signals.

Any combination of one or more computer-usable or computer-readable media may be utilized. The computer-usable or computer-readable media may be, for example, but not limited to, an electronic, magnetic, optical, electromagnetic, infrared, or semiconductor system, apparatus, device, or propagation medium. More specific examples (a non-exhaustive list) of the computer-readable media would include the following: an electrical connection having one or more wires, a portable computer diskette, a hard disk, RAM, ROM, an erasable programmable read-only memory (for example, EPROM, EEPROM, or Flash memory), an optical fiber, a portable compact disc read-only memory (CD-ROM), an optical storage device, a transmission media such as those supporting the Internet or an intranet, or a magnetic storage device. Note that the computer-usable or computer-readable media could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable media may be any medium that can contain, store, communicate, propagate, or transport the program for use by or in connection with the instruction execution system, apparatus, or device. The computer -usable media may include a propagated data signal with the computer-usable program code embodied therewith, either in baseband or as part of a carrier wave. The computer -usable program code may be transmitted using any appropriate medium, including but not limited to wireless, wireline, optical fiber cable, radio frequency, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations or block diagrams of processes, apparatus (systems) and computer program products according to embodiments of the disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart or block diagram block or blocks.

EXAMPLES

Example 1 may include one or more computer-readable media having instructions to test a user equipment (UE), upon execution of the instructions by one or more processors, to:

determine a set of idle periods for a medium, wherein individual idle periods of the set of idle periods include intervals with durations that are larger than a first predefined idle duration time, or intervals between two occupied periods for the medium;

identify a set of bins of a contention window, wherein each individual bin of the set of bins has an associated probability, a first bin of the set of bins to include a first interval with a first associated probability, and a second bin of the set of bins to include a second interval with a second associated probability that is larger than the first associated probability;

assign the individual idle periods of the set of idle periods to individual bins of the set of bins;

count a number of idle periods assigned to each individual bin of the set of bins; and determine that the UE has a pass status or a failure status based on the number of idle periods assigned to each individual bin of the set of bins, and the associated probability for each individual bin of the set of bins.

Example 2 may include the one or more non-transitory computer-readable media of example 1 and/or some other examples herein, wherein the instructions to test the UE, upon execution of the instructions by the one or more processors, is to assign an individual idle period of the set of idle periods to a bin of the set of bins when a duration of the individual idle period is larger than or equal to a lower bound of an interval included in the bin and smaller than an upper bound of the interval included in the bin.

Example 3 may include the one or more non-transitory computer-readable media of example 1 and/or some other examples herein, wherein the instructions to test the UE, upon execution of the instructions by the one or more processors, is to determine that the UE has the pass status when a probability calculated for each individual bin of the set of bins based on the number of idle periods assigned to each individual bin is smaller than or equal to the associated probability for each individual bin of the set of bins.

Example 4 may include the one or more non-transitory computer-readable media of example 1 and/or some other examples herein, wherein the instructions to test the UE, upon execution of the instructions by the one or more processors, is to determine that the UE has the failure status when a probability calculated for a bin of the set of bins based on a number of idle periods assigned to the bin is larger than an associated probability for the bin.

Example 5 may include the one or more non-transitory computer-readable media of example 1 and/or some other examples herein, wherein the instructions to test the UE, upon execution of the instructions by the one or more processors, is to determine that the UE has the failure status when an occupied period for the medium has a duration larger than a predetermined occupancy duration.

Example 6 may include the one or more non-transitory computer-readable media of example 1 and/or some other examples herein, wherein an occupied period for the medium is a time interval within a predefined time interval, the occupied period for the medium includes one or more occupied time intervals, any neighboring occupied time intervals of the occupied period for the medium is separated by a non-occupied time interval of a duration less than or equal to a second predefined idle duration time.

Example 7 may include the one or more non-transitory computer-readable media of example 6 and/or some other examples herein, wherein the instructions to test the UE, upon execution of the instructions by the one or more processors, is further to:

generate a set of records, wherein each record of the set of records is a time interval within the predefined time interval, the set of records includes a plurality of occupied time intervals and a plurality of non-occupied time intervals, each occupied time interval of the plurality of occupied time intervals includes a time interval when the medium is occupied, each non-occupied time interval includes a time interval when the medium is not occupied; and determine the set of idle periods based on the set of records.

Example 8 may include the one or more non-transitory computer-readable media of any one of examples 1-7 and/or some other examples herein, wherein an occupied time interval of the plurality of occupied time intervals is indicated by a start time and a duration of the occupied time interval, and a non-occupied time interval of the plurality of non-occupied time intervals is indicated by a start time and a duration of the non-occupied time interval.

Example 9 may include the one or more non-transitory computer-readable media of any one of examples 1-7 and/or some other examples herein, wherein an occupied time interval of the plurality of occupied time intervals includes a start time and a duration of a time interval when the medium is occupied by a transmission performed by the UE or by a companion device communicating with the UE.

Example 10 may include the one or more non-transitory computer-readable media of any one of examples 1-7 and/or some other examples herein, wherein an occupied period includes one or more time intervals of the plurality of occupied time intervals for one or more transmissions performed by the UE and zero or more time intervals of the plurality of occupied time intervals for zero or more transmissions performed by a companion device communicating with the UE.

Example 11 may include the one or more non-transitory computer-readable media of any one of examples 1-7 and/or some other examples herein, wherein the medium includes one or more channels.

Example 12 may include the one or more non-transitory computer-readable media of any one of examples 1-7 and/or some other examples herein, wherein the UE is an initiating device, a responding device, a supervising device, or a supervised device.

Example 13 may include one or more computer-readable media having instructions to test a user equipment (UE), upon execution of the instructions by one or more processors, to:

identify a set of bins of a contention window, wherein each individual bin of the set of bins has an associated probability, a first bin of the set of bins to include a first interval with a first associated probability, and a second bin of the set of bins to include a second interval with a second associated probability that is larger than the first associated probability;

assign each individual idle period of a set of idle periods for a medium to a corresponding bin of the set of bins, wherein each individual idle period of the set of idle periods for the medium includes an interval with a duration that is larger than a first predefined idle duration time, or between two occupied periods for the medium; and determine that the UE has a pass status or a failure status based on each individual idle period assigned to the corresponding bin of the set of bins, and the associated probability for the corresponding bin.

Example 14 may include the one or more non-transitory computer-readable media of example 13 and/or some other examples herein, wherein the instructions to test the UE, upon execution of the instructions by the one or more processors, is further to:

generate a set of records, wherein each record of the set of records is a time interval within a predefined time interval, the set of records includes a plurality of occupied time intervals and a plurality of non-occupied time intervals, each occupied time interval of the plurality of occupied time intervals includes a time interval when the medium is occupied, each non-occupied time interval includes a time interval when the medium is not occupied, an occupied period for the medium is a time interval within the predefined time interval, the occupied period for the medium includes one or more occupied time intervals, any neighboring occupied time intervals of the occupied period for the medium is separated by a non-occupied time interval of a duration less than or equal to a second predefined idle duration time; and determine the set of idle periods based on the set of records.

Example 15 may include the one or more non-transitory computer-readable media of any one of examples 13-14 and/or some other examples herein, wherein the instructions to test the UE, upon execution of the instructions by the one or more processors, is to determine that the UE has the pass status when a probability calculated for each individual bin of the set of bins based on a number of idle periods assigned to each individual bin is smaller than or equal to the associated probability for each individual bin of the set of bins.

Example 16 may include the one or more non-transitory computer-readable media of any one of examples 13-14 and/or some other examples herein, wherein the instructions to test the UE, upon execution of the instructions by the one or more processors, is to determine that the UE has the failure status when a probability calculated for a bin of the set of bins based on a number of idle periods assigned to the bin is larger than an associated probability for the bin.

Example 17 may include the one or more non-transitory computer-readable media of any one of examples 13-14 and/or some other examples herein, wherein an occupied time interval of the one or more occupied time intervals includes a start time and a duration of the occupied time interval when the medium is occupied by a transmission performed by the UE or by a companion device communicating with the UE.

Example 18 may include a system for testing a user equipment (UE), comprising:
 a companion device to communicate with the UE; and
 a tester to be coupled to the UE and the companion device, wherein the tester is to:
  identify a set of bins of a contention window, wherein each individual bin of the set of bins has an associated probability, a first bin of the set of bins to include a first interval with a first associated probability, and a second bin of the set of bins to include a second interval with a second associated probability that is larger than the first associated probability;
  assign each individual idle period of a set of idle periods for a medium to a corresponding bin of the set of bins, wherein each individual idle period of the set of idle periods for the medium includes an interval with a duration that is larger than a first predefined idle duration time, or between two occupied periods for the medium; and
  determine that the UE has a pass status or a failure status based on each individual idle period assigned to the corresponding bin of the set of bins, and the associated probability for the corresponding bin.

Example 19 may include the system of example 18 and/or some other examples herein, wherein the tester is further to:
 generate a set of records, wherein each record of the set of records is a time interval within a predefined time interval, the set of records includes a plurality of occupied time intervals and a plurality of non-occupied time intervals, each occupied time interval of the plurality of occupied time intervals includes a time interval when the medium is occupied, each non-occupied time interval includes a time interval when the medium is not occupied, an occupied period for the medium is a time interval within the predefined time interval, the occupied period for the medium includes one or more occupied time intervals, any neighboring occupied time intervals of the occupied period for the medium is separated by a non-occupied time interval of a duration less than or equal to a second predefined idle duration time; and
 determine the set of idle periods based on the set of records.

Example 20 may include the system of any one of examples 18-19 and/or some other examples herein, wherein the tester is to determine that the UE has the pass status when a probability calculated for each individual bin of the set of bins based on a number of idle periods assigned to each individual bin is smaller than or equal to the associated probability for each individual bin of the set of bins.

Example 21 may include the system of any one of examples 18-19 and/or some other examples herein, wherein the tester is to determine that the UE has the failure status when a probability calculated for a bin of the set of bins based on a number of idle periods assigned to the bin is larger than an associated probability for the bin.

Example 22 may include the system of any one of examples 18-19 and/or some other examples herein, wherein an occupied time interval of the plurality of occupied time intervals includes a start time and a duration of a transmission when the medium is occupied by the transmission performed by the UE or by the companion device communicating with the UE.

Example 23 may include the system of any one of examples 18-19 and/or some other examples herein, wherein an occupied period includes one or more occupied time intervals of the plurality of occupied time intervals for one or more transmissions performed by the UE and zero or more occupied time intervals of the plurality of occupied time intervals for zero or more transmissions performed by the companion device communicating with the UE.

Example 24 may include the system of any one of examples 18-19 and/or some other examples herein, wherein the medium includes one or more channels.

Example 25 may include the system of any one of examples 18-19 and/or some other examples herein, wherein the UE is an initiating device, a responding device, a supervising device, or a supervised device.

Example 26 may include a method for testing a user equipment (UE), comprising:
 determining a set of idle periods for a medium, wherein individual idle periods of the set of idle periods include intervals with durations that are larger than a first predefined idle duration time, or intervals between two occupied periods for the medium;
 identifying a set of bins of a contention window, wherein each individual bin of the set of bins has an associated probability, a first bin of the set of bins to include a first interval with a first associated probability, and a second bin of the set of bins to include a second interval with a second associated probability that is larger than the first associated probability;
 assigning the individual idle periods of the set of idle periods to individual bins of the set of bins;
 counting a number of idle periods assigned to each individual bin of the set of bins; and
 determining that the UE has a pass status or a failure status based on the number of idle periods assigned to each individual bin of the set of bins, and the associated probability for each individual bin of the set of bins.

Example 27 may include the method of example 26 and/or some other examples herein, wherein the assigning the individual idle periods is to assign an individual idle period of the set of idle periods to a bin of the set of bins, when a duration of the individual idle period is larger than or equal to a lower bound of an interval included in the bin, and smaller than an upper bound of the interval included in the bin.

Example 28 may include the method of example 26 and/or some other examples herein, wherein the determining that the UE has a pass status or a failure status is to determine that the UE has the pass status when a probability calculated for each individual bin of the set of bins based on the number of idle periods assigned to each individual bin is smaller than or equal to the associated probability for each individual bin of the set of bins.

Example 29 may include the method of example 26 and/or some other examples herein, wherein the determining that the UE has a pass status or a failure status is to determine that the UE has the failure status when a probability calculated for a bin of the set of bins based on a number of idle periods assigned to the bin is larger than an associated probability for the bin.

Example 30 may include the method of example 26 and/or some other examples herein, wherein the determining that the UE has a pass status or a failure status is to determine that the UE has the failure status when an occupied period for the medium has a duration larger than a predetermined occupancy duration.

Example 31 may include the method of example 26 and/or some other examples herein, wherein an occupied period for the medium is a time interval within a predefined time interval, the occupied period for the medium includes one or more occupied time intervals, any neighboring occupied time intervals of the occupied period for the medium is separated by a non-occupied time interval of a duration less than or equal to a second predefined idle duration time.

Example 32 may include the method of example 31 and/or some other examples herein, further comprising:

generating a set of records, wherein each record of the set of records is a time interval within the predefined time interval, the set of records includes a plurality of occupied time intervals and a plurality of non-occupied time intervals, each occupied time interval of the plurality of occupied time intervals includes a time interval when the medium is occupied, each non-occupied time interval includes a time interval when the medium is not occupied; and determining the set of idle periods based on the set of records.

Example 33 may include the method of any one of examples 26-32 and/or some other examples herein, wherein an occupied time interval of the plurality of occupied time intervals is indicated by a start time and a duration of the occupied time interval, and a non-occupied time interval of the plurality of non-occupied time intervals is indicated by a start time and a duration of the non-occupied time interval.

Example 34 may include the method of any one of examples 26-32 and/or some other examples herein, wherein an occupied time interval of the plurality of occupied time intervals includes a start time and a duration of a time interval when the medium is occupied by a transmission performed by the UE or by a companion device communicating with the UE.

Example 35 may include the method of any one of examples 26-32 and/or some other examples herein, wherein an occupied period includes one or more time intervals of the plurality of occupied time intervals for one or more transmissions performed by the UE and zero or more time intervals of the plurality of occupied time intervals for zero or more transmissions performed by a companion device communicating with the UE.

Example 36 may include the method of any one of examples 26-32 and/or some other examples herein, wherein the medium includes one or more channels.

Example 37 may include the method of any one of examples 26-32 and/or some other examples herein, wherein the UE is an initiating device, a responding device, a supervising device, or a supervised device.

Example 38 may include a method for testing a user equipment (UE), comprising:

identifying a set of bins of a contention window, wherein each individual bin of the set of bins has an associated probability, a first bin of the set of bins to include a first interval with a first associated probability, and a second bin of the set of bins to include a second interval with a second associated probability that is larger than the first associated probability;

assigning each individual idle period of a set of idle periods for a medium to a corresponding bin of the set of bins, wherein each individual idle period of the set of idle periods for the medium includes an interval with a duration that is larger than a first predefined idle duration time, or between two occupied periods for the medium; and determining that the UE has a pass status or a failure status based on each individual idle period assigned to the corresponding bin of the set of bins, and the associated probability for the corresponding bin.

Example 39 may include the method of example 38 and/or some other examples herein, further comprising:

generating a set of records, wherein each record of the set of records is a time interval within a predefined time interval, the set of records includes a plurality of occupied time intervals and a plurality of non-occupied time intervals, each occupied time interval of the plurality of occupied time intervals includes a time interval when the medium is occupied, each non-occupied time interval includes a time interval when the medium is not occupied, an occupied period for the medium is a time interval within the predefined time interval, the occupied period for the medium includes one or more occupied time intervals, any neighboring occupied time intervals of the occupied period for the medium is separated by a non-occupied time interval of a duration less than or equal to a second predefined idle duration time; and determining the set of idle periods based on the set of records.

Example 40 may include the method of any one of examples 38-39 and/or some other examples herein, wherein the determining that the UE has a pass status or a failure status is to determine that the UE has the pass status when a probability calculated for each individual bin of the set of bins based on a number of idle periods assigned to each individual bin is smaller than or equal to the associated probability for each individual bin of the set of bins.

Example 41 may include the method of any one of examples 38-39 and/or some other examples herein, wherein the determining that the UE has a pass status or a failure status is to determine that the UE has the failure status when a probability calculated for a bin of the set of bins based on a number of idle periods assigned to the bin is larger than an associated probability for the bin.

Example 42 may include the method of any one of examples 38-39 and/or some other examples herein, wherein an occupied time interval of the one or more occupied time intervals includes a start time and a duration of the occupied time interval when the medium is occupied by a transmission performed by the UE or by a companion device communicating with the UE.

Example 43 may include one or more computer-readable media having instructions to test a user equipment (UE), upon execution of the instructions by one or more processors, to perform the method of any one of examples 26-42.

Example 44 may include an apparatus for a tester to be coupled to a user equipment (UE) and to test the UE, comprising:

means for performing the method of any one of examples 26-42.

Example 45 may include an apparatus comprising means to perform one or more elements of a method described in or related to any of examples 1-44, or any other method or process described herein.

Example 46 may include one or more computer-readable media comprising instructions to cause an electronic device, upon execution of the instructions by one or more processors of the electronic device, to perform one or more elements of a method described in or related to any of examples 1-44, or any other method or process described herein.

Example 47 may include an apparatus comprising logic, modules, and/or circuitry to perform one or more elements of a method described in or related to any of examples 1-44, or any other method or process described herein.

Example 48 may include a method, technique, or process as described in or related to any of examples 1-44, or portions or parts thereof.

Example 49 may include an apparatus comprising: one or more processors and one or more computer readable media comprising instructions that, when executed by the one or more processors, cause the one or more processors to perform the method, techniques, or process as described in or related to any of examples 1-44, or portions thereof.

Example 50 may include a method of communicating in a wireless network as shown and described herein.

Example 51 may include a system for providing wireless communication as shown and described herein.

Example 52 may include a device for providing wireless communication as shown and described herein.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. One or more non-transitory computer-readable media having instructions to test a user equipment (UE), upon execution of the instructions by one or more processors, to:
   determine a set of idle periods for a medium, wherein individual idle periods of the set of idle periods include intervals with durations that are larger than a first predefined idle duration time, or intervals between two occupied periods for the medium;
   identify a set of bins of a contention window, wherein each individual bin of the set of bins has an associated probability, a first bin of the set of bins to include a first interval with a first associated probability, and a second bin of the set of bins to include a second interval with a second associated probability that is larger than the first associated probability;
   assign the individual idle periods of the set of idle periods to individual bins of the set of bins;
   count a number of idle periods assigned to each individual bin of the set of bins; and
   determine that the UE has a pass status or a failure status based on the number of idle periods assigned to each individual bin of the set of bins, and the associated probability for each individual bin of the set of bins.

2. The one or more non-transitory computer-readable media of claim 1, wherein the instructions to test the UE, upon execution of the instructions by the one or more processors, is to assign an individual idle period of the set of idle periods to a bin of the set of bins when a duration of the individual idle period is larger than or equal to a lower bound of an interval included in the bin and smaller than an upper bound of the interval included in the bin.

3. The one or more non-transitory computer-readable media of claim 1, wherein the instructions to test the UE, upon execution of the instructions by the one or more processors, is to determine that the UE has the pass status when a probability calculated for each individual bin of the set of bins based on the number of idle periods assigned to each individual bin is smaller than or equal to the associated probability for each individual bin of the set of bins.

4. The one or more non-transitory computer-readable media of claim 1, wherein the instructions to test the UE, upon execution of the instructions by the one or more processors, is to determine that the UE has the failure status when a probability calculated for a bin of the set of bins based on a number of idle periods assigned to the bin is larger than an associated probability for the bin.

5. The one or more non-transitory computer-readable media of claim 1, wherein the instructions to test the UE, upon execution of the instructions by the one or more processors, is to determine that the UE has the failure status when an occupied period for the medium has a duration larger than a predetermined occupancy duration.

6. The one or more non-transitory computer-readable media of claim 1, wherein an occupied period for the medium is a time interval within a predefined time interval, the occupied period for the medium includes one or more occupied time intervals, any neighboring occupied time intervals of the occupied period for the medium is separated by a non-occupied time interval of a duration less than or equal to a second predefined idle duration time.

7. The one or more non-transitory computer-readable media of claim 6, wherein the instructions to test the UE, upon execution of the instructions by the one or more processors, is further to:
   generate a set of records, wherein each record of the set of records is a time interval within the predefined time interval, the set of records includes a plurality of occupied time intervals and a plurality of non-occupied time intervals, each occupied time interval of the plurality of occupied time intervals includes a time interval when the medium is occupied, each non-occupied time interval includes a time interval when the medium is not occupied; and
   determine the set of idle periods based on the set of records.

8. The one or more non-transitory computer-readable media of claim 7, wherein an occupied time interval of the plurality of occupied time intervals is indicated by a start time and a duration of the occupied time interval, and a non-occupied time interval of the plurality of non-occupied time intervals is indicated by a start time and a duration of the non-occupied time interval.

9. The one or more non-transitory computer-readable media of claim 7, wherein an occupied time interval of the plurality of occupied time intervals includes a start time and a duration of a time interval when the medium is occupied by a transmission performed by the UE or by a companion device communicating with the UE.

10. The one or more non-transitory computer-readable media of claim 7, wherein an occupied period includes one or more time intervals of the plurality of occupied time intervals for one or more transmissions performed by the UE and zero or more time intervals of the plurality of occupied time intervals for zero or more transmissions performed by a companion device communicating with the UE.

11. The one or more non-transitory computer-readable media of claim 1, wherein the medium includes one or more channels.

12. The one or more non-transitory computer-readable media of claim 1, wherein the UE is an initiating device, a responding device, a supervising device, or a supervised device.

13. One or more non-transitory computer-readable media having instructions to test a user equipment (UE), upon execution of the instructions by one or more processors, to:
identify a set of bins of a contention window, wherein each individual bin of the set of bins has an associated probability, a first bin of the set of bins to include a first interval with a first associated probability, and a second bin of the set of bins to include a second interval with a second associated probability that is larger than the first associated probability;
assign each individual idle period of a set of idle periods for a medium to a corresponding bin of the set of bins, wherein each individual idle period of the set of idle periods for the medium includes an interval with a duration that is larger than a first predefined idle duration time, or between two occupied periods for the medium; and
determine that the UE has a pass status or a failure status based on each individual idle period assigned to the corresponding bin of the set of bins, and the associated probability for the corresponding bin.

14. The one or more non-transitory computer-readable media of claim 13, wherein the instructions to test the UE, upon execution of the instructions by the one or more processors, is further to:
generate a set of records, wherein each record of the set of records is a time interval within a predefined time interval, the set of records includes a plurality of occupied time intervals and a plurality of non-occupied time intervals, each occupied time interval of the plurality of occupied time intervals includes a time interval when the medium is occupied, each non-occupied time interval includes a time interval when the medium is not occupied, an occupied period for the medium is a time interval within the predefined time interval, the occupied period for the medium includes one or more occupied time intervals, any neighboring occupied time intervals of the occupied period for the medium is separated by a non-occupied time interval of a duration less than or equal to a second predefined idle duration time; and
determine the set of idle periods based on the set of records.

15. The one or more non-transitory computer-readable media of claim 14, wherein the instructions to test the UE, upon execution of the instructions by the one or more processors, is to determine that the UE has the pass status when a probability calculated for each individual bin of the set of bins based on each individual number of idle periods assigned to each individual bin is smaller than or equal to the associated probability for each individual bin of the set of bins.

16. The one or more non-transitory computer-readable media of claim 14, wherein the instructions to test the UE, upon execution of the instructions by the one or more processors, is to determine that the UE has the failure status when a probability calculated for a bin of the set of bins based on a number of idle periods assigned to the bin is larger than an associated probability for the bin.

17. The one or more non-transitory computer-readable media of claim 14, wherein an occupied time interval of the one or more occupied time intervals includes a start time and a duration of the occupied time interval when the medium is occupied by a transmission performed by the UE or by a companion device communicating with the UE.

18. A system for testing a user equipment (UE), comprising:
a companion device to communicate with the UE; and
a tester to be coupled to the UE and the companion device, wherein the tester is to:
identify a set of bins of a contention window, wherein each individual bin of the set of bins has an associated probability, a first bin of the set of bins to include a first interval with a first associated probability, and a second bin of the set of bins to include a second interval with a second associated probability that is larger than the first associated probability;
assign each individual idle period of a set of idle periods for a medium to a corresponding bin of the set of bins, wherein each individual idle period of the set of idle periods for the medium includes an interval with a duration that is larger than a first predefined idle duration time, or between two occupied periods for the medium; and
determine that the UE has a pass status or a failure status based on each individual idle period assigned to the corresponding bin of the set of bins, and the associated probability for the corresponding bin.

19. The system of claim 18, wherein the tester is further to:
generate a set of records, wherein each record of the set of records is a time interval within a predefined time interval, the set of records includes a plurality of occupied time intervals and a plurality of non-occupied time intervals, each occupied time interval of the plurality of occupied time intervals includes a time interval when the medium is occupied, each non-occupied time interval includes a time interval when the medium is not occupied, an occupied period for the medium is a time interval within the predefined time interval, the occupied period for the medium includes one or more occupied time intervals, any neighboring occupied time intervals of the occupied period for the medium is separated by a non-occupied time interval of a duration less than or equal to a second predefined idle duration time; and
determine the set of idle periods based on the set of records.

20. The system of claim 18, wherein the tester is to determine that the UE has the pass status when a probability calculated for each individual bin of the set of bins based on each individual number of idle periods assigned to each individual bin is smaller than or equal to the associated probability for each individual bin of the set of bins.

21. The system of claim 18, wherein the tester is to determine that the UE has the failure status when a probability calculated for a bin of the set of bins based on a number of idle periods assigned to the bin is larger than an associated probability for the bin.

22. The system of claim 19, wherein an occupied time interval of the plurality of occupied time intervals includes a start time and duration of a transmission when the medium is occupied by the transmission performed by the UE or by the companion device communicating with the UE.

23. The system of claim 19, wherein an occupied period includes one or more occupied time intervals of the plurality of occupied time intervals for one or more transmissions performed by the UE and zero or more occupied time intervals of the plurality of occupied time intervals for zero or more transmissions performed by a companion device communicating with the UE.

24. The system of claim 18, wherein the medium includes one or more channels.

25. The system of claim 18, wherein the UE is an initiating device, a responding device, a supervising device, or a supervised device.

* * * * *